(12) United States Patent
Aydin et al.

(10) Patent No.: US 9,980,218 B2
(45) Date of Patent: May 22, 2018

(54) SYSTEM AND METHOD FOR USER TERMINAL-AWARE CELL SWITCH-OFF

(71) Applicant: Huawei Technologies Canada Co., Ltd., Kanata (CA)

(72) Inventors: Ibrahim Aydin, Pendik Istanbul (TR); Ngoc Dung Dao, Ottawa (CA); Nimal Gamini Senarath, Ottawa (CA); Halim Yanikomeroglu, Ottawa (CA)

(73) Assignee: Huawei Technologies Canada Co., LTD., Kanata (CA)

( * ) Notice: Subject to any disclaimer, the term of this patent is extended or adjusted under 35 U.S.C. 154(b) by 145 days.

(21) Appl. No.: 15/052,261

(22) Filed: Feb. 24, 2016

(65) Prior Publication Data

US 2016/0255581 A1  Sep. 1, 2016

Related U.S. Application Data

(60) Provisional application No. 62/121,692, filed on Feb. 27, 2015.

(51) Int. Cl.
*H04W 52/02* (2009.01)
*H04W 52/26* (2009.01)
*H04W 52/14* (2009.01)

(52) U.S. Cl.
CPC ..... *H04W 52/0206* (2013.01); *H04W 52/265* (2013.01); *H04W 52/146* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2011/0128901 A1* | 6/2011 | Lee | ..... | H04L 27/2608 370/311 |
| 2012/0108245 A1* | 5/2012 | Zhang | ..... | H04W 28/08 455/443 |
| 2012/0165063 A1* | 6/2012 | Scalia | ..... | H04W 52/343 455/522 |
| 2012/0244869 A1* | 9/2012 | Song | ..... | H04W 52/0206 455/449 |

(Continued)

FOREIGN PATENT DOCUMENTS

| | | |
|---|---|---|
| CN | 103269511 A | 8/2013 |
| CN | 103906211 A | 7/2014 |
| CN | 104320837 A | 1/2015 |

OTHER PUBLICATIONS

Alaca, F., et al., "A Genetic Algorithm Based Cell Switch-Off Scheme for Energy Saving in Dense Cell Deployments," 2012 IEEE Globecom Workshops (GC Wkshps), Dec. 3-7, 2012, pp. 63-68.

(Continued)

*Primary Examiner* — Steven H Nguyen
(74) *Attorney, Agent, or Firm* — Slater Matsil, LLP

(57) ABSTRACT

Cell switch-off (CSO) methods for base stations (BSs) in a wireless network are provided. The CSO methods utilize quality of service (QoS) requirement information of user equipments (UEs) to determine which BS to switch off according to a pre-defined criteria. The criteria is defined so that impact of switching off a BS on the UEs may be reduced, and/or QoS requirements of at least some of the UEs may be satisfied if a BS was switched off.

22 Claims, 13 Drawing Sheets

(56) References Cited

U.S. PATENT DOCUMENTS

| | | | | |
|---|---|---|---|---|
| 2013/0053039 | A1* | 2/2013 | Jorguseski | H04W 24/02 455/436 |
| 2013/0130670 | A1* | 5/2013 | Samdanis | H04W 24/02 455/418 |
| 2013/0143580 | A1 | 6/2013 | Michel | |
| 2013/0252611 | A1* | 9/2013 | Rose | H04W 48/12 455/436 |
| 2013/0252660 | A1* | 9/2013 | Bach | H04W 52/0206 455/525 |
| 2013/0272132 | A1* | 10/2013 | Heo | H04W 28/02 370/236.2 |
| 2013/0288681 | A1* | 10/2013 | Hamalainen | H04W 36/0061 455/436 |
| 2014/0011543 | A1* | 1/2014 | Li | H04W 52/0206 455/561 |
| 2014/0051446 | A1* | 2/2014 | Rose | H04W 36/165 455/436 |
| 2014/0080493 | A1* | 3/2014 | Baumgartner | H04W 52/0206 455/450 |
| 2014/0146700 | A1* | 5/2014 | Fonseca Dos Santos | H04W 24/08 370/252 |
| 2014/0170965 | A1* | 6/2014 | Li | H04W 28/08 455/7 |
| 2014/0213239 | A1* | 7/2014 | Hahn | H04W 16/08 455/418 |
| 2014/0269313 | A1* | 9/2014 | Liu | H04W 24/02 370/235 |
| 2014/0286218 | A1* | 9/2014 | Park | H04W 52/0203 370/311 |
| 2014/0370930 | A1* | 12/2014 | Kurokochi | H04W 16/32 455/522 |
| 2015/0023163 | A1* | 1/2015 | Gonzalez | H04W 52/0206 370/230 |
| 2015/0078227 | A1* | 3/2015 | Kong | H04W 52/0206 370/311 |
| 2015/0094077 | A1* | 4/2015 | Lin | H04W 52/0206 455/452.1 |
| 2015/0304857 | A1* | 10/2015 | Hong | H04W 24/02 370/254 |
| 2016/0007279 | A1* | 1/2016 | Byun | H04W 52/0206 455/422.1 |
| 2016/0029305 | A1* | 1/2016 | Kim | H04W 24/02 370/311 |
| 2016/0044514 | A1* | 2/2016 | Acharya | H04W 24/02 370/328 |
| 2016/0142973 | A1* | 5/2016 | Lee | H04W 36/165 370/311 |

OTHER PUBLICATIONS

Aydin, I., "User-Aware Cell Switch-off Algorithms," International Wireless Communications and Mobile Computing Conference (IWCMC), Aug. 24-28, 2015, pp. 1236-1241.

Bousia, A., et al., "Green Distance-Aware Base Station Sleeping Algorithm in LTE-Advanced," 2012 IEEE International Conference on Communications (ICC), Jun. 10-15, 2012, pp. 1347-1351.

Bousia, A., et al., "Energy Efficient Base Station Maximization Switch Off Scheme for LTE-Advanced," Communication Links and Networks (CAMAD), Sep. 17-19, 2012, pp. 256-260.

Chen, Y., et al., "Fundamental Trade-Offs on Green Wireless Networks," IEEE Communications Magazine, vol. 49, No. 6, Jun. 2011, pp. 30-37.

Chilamkurti, G., et al., "Green Networking for Major Components of Information Communication Technology Systems," EURASIP Journal on Wireless Communications and Networking, vol. 2009, Dec. 13, 2009, 7 pages.

Gonzalez, D., et al., "A Novel Multiobjective Framework for Cell Switch-Off in Dense Cellular Networks," 2014 IEEE International Conference on Communications (ICC), Jun. 10-14, 2014, pp. 2641-2647.

Guvenc, I., "Range Expansion and Inter-Cell Interference Coordination (ICIC) for Picocell Networks," Vehicular Technology Conference (VTC Fall), Sep. 5-8, 2011, pp. 1-6.

Humar, I., et al., "Rethinking Energy Efficiency Models of Cellular Networks With Embodied Energy," IEEE Network, vol. 25, No. 2, Mar.-Apr. 2011, pp. 40-49.

Kang, T., et al., "Base Station Switching Based Dynamic Energy Saving Algorithm for Cellular Networks," 2012 3rd IEEE International Conference on Network Infrastructure and Digital Content (IC-NIDC), Sep. 21-23, 2012, pp. 66-70.

Kumar, A., et al., "Energy and Throughput Trade-Offs in Cellular Networks Using Base Station Switching," IEEE Transactions on Mobile Computing, vol. 15, No. 2, Feb. 1, 2016, pp. 364-376.

Marsan, M., et al., "On the Effectiveness of Single and Multiple Base Station sleep Modes in Cellular Networks," Computer Networks, vol. 57, Issue 17, Dec. 9, 2013, pp. 3276-3290.

Marsan, M., et al., "Optimal Energy Savings in Cellular Access Networks," IEEE International Conference on Communications Workshops, Jun. 14-18, 2009, pp. 1-5.

Miao, G., "Cross-Layer Optimization for Energy-Efficient Wireless Communications: A Survey," Wireless Communications and Mobile Computing, vol. 9, No. 4, Apr. 2009, pp. 529-542.

Micallef, G., et al., "Cell Size Breathing and Possibilities to Introduce Cell Sleep Mode," 2010 European Wireless Conference (EW), Apr. 12-15, 2010, pp. 111-115.

Mirahsan, M., HetHetNets: Heterogeneous Traffic Distribution in Heterogeneous Wireless Cellular Networks, IEEE Journal on Selected Areas in Communications, vol. 33, No. 10, Oct. 2015, pp. 1-14.

Morosi, S., et al., "Improving Cellular Network Energy Efficiency by Joint Management of Sleep Mode and Transmission Power," 2013 24th Tyrrhenian International Workshop on Digital Communications—Green ICT (TIWDC), Sep. 23-25, 2013, pp. 1-6.

Niu, Z., et al., "Cell Zooming for Cost-Efficient Green Cellular Networks," IEEE Communications Magazine, vol. 48, No. 11, Nov. 2010, pp. 74-79.

Oh, E., et al., "Dynamic Base Station Switching-On/Off Strategies for Green Cellular Networks," IEEE Transactions on Wireless Communications, vol. 12, No. 5, May 2013, pp. 2126-2136.

Paul, U., et al., "Understanding Traffic Dynamics in Cellular Data Networks," 2011 Proceedings IEEE INFOCOM, Apr. 10-15, 2011, pp. 882-890.

Peng, J., et al., "Stochastic Analysis of Optimal Base Station Energy Saving in Cellular Networks with Sleep Mode," IEEE Communications Letters, vol. 18, No. 4, pp. 612-615, Apr. 2014.

Son, K., "SpeedBalance: Speed-Scaling-Aware Optimal Load Balancing for Green Cellular Networks," INFOCOM 2012 Proceedings IEEE, Mar. 25-30, 2012, pp. 2816-2820.

Suarez, L., et al., "Analysis of the Overall Energy Savings Achieved by Green Cell-Breathing Mechanisms," Sustainable Internet and ICT for Sustainability (SustainIT), Oct. 4-5, 2012, pp. 1-6.

Turyagyenda, C., et al., "A Novel Sleep Mode Operation for Energy Efficient LTE Cellular Networks: A Sum Product Algorithm Implementation," 2013 Seventh International Conference on Next Generation Mobile Apps, Services and Technologies (NGMAST), Sep. 25-27, 2013, pp. 159-164.

* cited by examiner

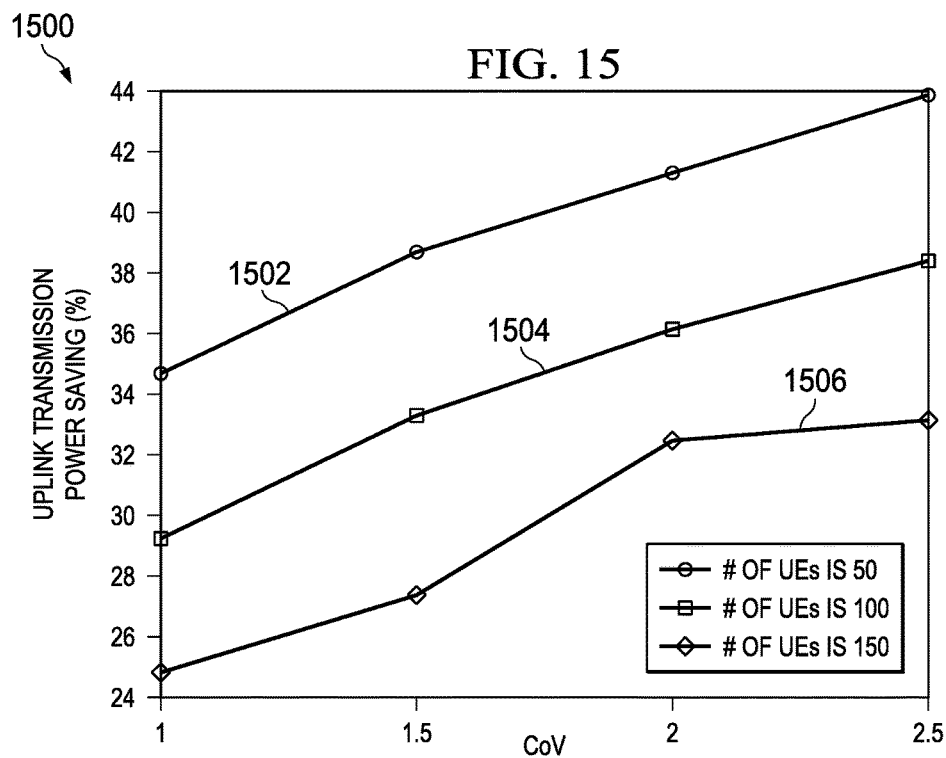
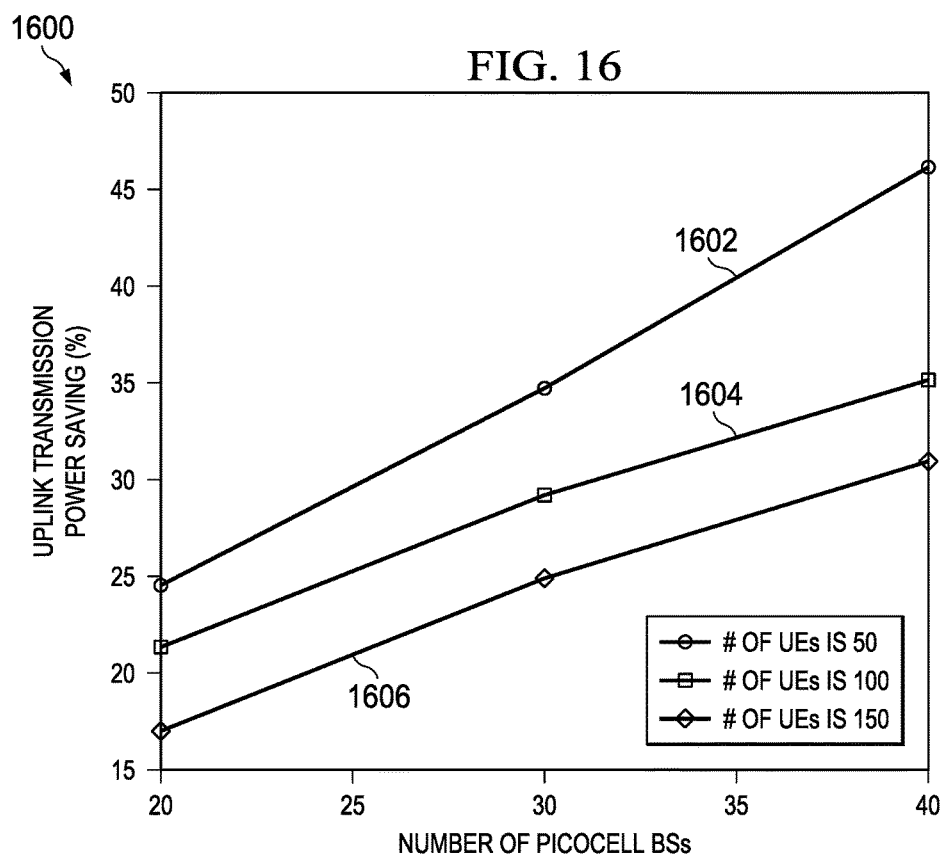

SYSTEM AND METHOD FOR USER TERMINAL-AWARE CELL SWITCH-OFF

This patent application claims priority to U.S. Provisional Application No. 62/121,692, filed on Feb. 27, 2015 and entitled "System and Method for User Terminal-Aware Cell Switch-Off," which is hereby incorporated by reference herein as if reproduced in its entirety.

TECHNICAL FIELD

The present invention relates to wireless communications, and, in particular embodiments, to a system and method for user terminal-aware cell switch-off.

BACKGROUND

As the number of subscribers and traffic volume in wireless networks continues to grow, so does energy consumption. It is estimated that information technology industry accounts to about 2% of worldwide electric energy consumption, and that number is projected to increase in the future. It is therefore desirable to develop techniques for operating wireless networks in an energy efficient manner, while still satisfying network performance requirements.

SUMMARY

Technical advantages are generally achieved, by embodiments of this disclosure which describe a system and method for user terminal-aware cell switch-off.

In accordance with an embodiment, a method for cell switch-off is provided. The method includes receiving a set of quality of service (QoS) requirements for user equipments (UEs) being served by a plurality of base stations (BSs) in a wireless network. The method further includes selecting a BS in the plurality of BSs to switch off in accordance with at least one QoS requirement in the received set of QoS requirements. The method also includes sending an instruction to a device in the wireless network indicating that the selected BS is to be switched off. A device for performing this method is also provided.

In accordance with another embodiment, a method is also provided for switching off base stations (BSs) in a wireless network. The method includes estimating, for each of the BSs, an increase in an uplink transmission power level if a corresponding BS was switched off, based on at least uplink transmission rate information of user equipments (UEs) served by the BSs. The increase in the uplink transmission power level is associated with switching off the corresponding BS. The method further includes selecting a given one of the BSs to switch off, if the estimated increase in the uplink transmission power level associated with switching off the given BS satisfies a first criteria, and sending an instruction to a device indicating that the given BS is to be switched off.

BRIEF DESCRIPTION OF THE DRAWINGS

For a more complete understanding of the present invention, and the advantages thereof, reference is now made to the following descriptions taken in conjunction with the accompanying drawing, in which:

FIG. 15 illustrates a graph of how uplink transmission power saving varies with CoV;

FIG. 16 illustrates a graph of how uplink transmission power saving varies with the number of picocell BSs;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In conventional cell switch-off (CSO) methods, when a base station (BS) is switched off, user experience of user equipments (UEs) previously served by the BS may be adversely affected. For example, increased uplink transmission powers may be required for the UEs to access the network, because the UEs may need to communicate with BSs that are farther away than the switched-off BS. This may shorten the battery life of the UEs, as well as increase transmission latency and reduce signal quality. These and other adverse effects may significantly degrade the quality of user experience. Throughout the disclosure, the terms "user equipment (UE)" and "user terminal (UT)" are used interchangeably.

Aspects of the present disclosure provide embodiment CSO methods that use quality of service (QoS) requirement information of UEs, together with other information, to determine which BS to switch off. Such CSO methods may mitigate reductions in user experience perceived by the UEs when a BS is switched off. Examples of QoS requirement information of the UEs include downlink or uplink transmission rate requirements, transmission power requirements, latency requirements, jitter requirements, packet loss requirements, error rate requirements. Other information, such as remaining battery information of the UEs, and power saving priority information of the UEs, may also be considered when deciding which BSs to switch off. In some embodiments, a BS is switched off when doing so satisfies a criteria. In one example, a BS is switched off if switching off the BS requires an increase in a transmission power level of the UEs that satisfies the criteria. The transmission power level of the UEs may be a total or average transmission power level of the UEs served by BSs in a wireless network. In another example, a BS will only be switched off if less than a threshold of UEs served by the BS are prioritized for power saving. In yet another example, a BS will only be switched off if less than a threshold number of UEs served by the BS have remaining battery power levels less than a battery threshold. In yet another example, a BS will be switched off if QoS requirements of at least a number of UEs being served by the BS are satisfied if the BS was switched off. Different criteria may also be used separately or in combination to make the determinations. Charging schemes may be defined based on the QoS requirement information and the criteria, so that users can enjoy different levels of user experience while the network energy is conserved by switching off BSs.

Figure 1:
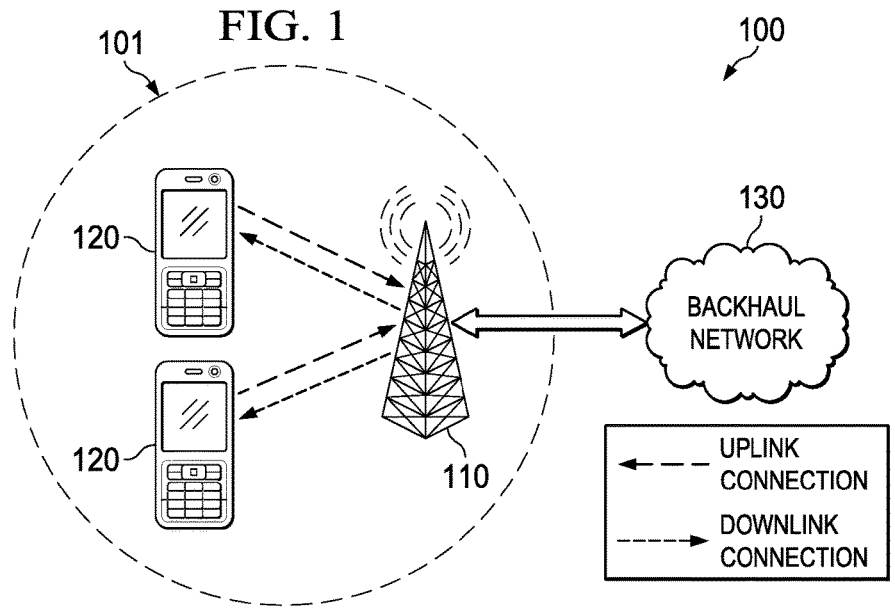
FIG. 1 illustrates a diagram of an embodiment wireless network.

FIG. 1 illustrates a wireless network 100 for communicating data. The network 100 comprises a base station 110 having a coverage area (or cell) 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a user terminal (UT), a mobile station (STA), and other wirelessly enabled devices. In some embodiments, the network 100 may comprise various other wireless devices, such as relays, low power nodes, etc.

Figure 2:
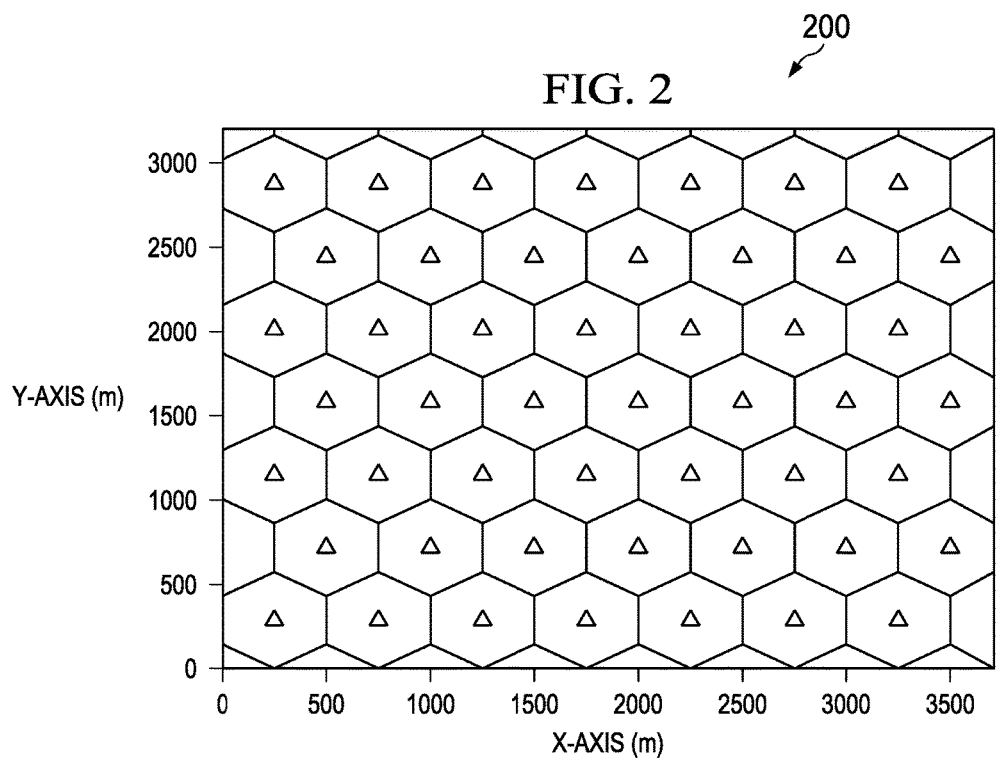
FIG. 2 illustrates a diagram of an embodiment wireless network layout.

FIG. 2 illustrates an embodiment layout of a wireless network 200 including a plurality of cells each of which is associated with a base station (BS), such as the base station 110. All of the cells in the wireless network 200 may have equal sizes and the same structures. Alternatively, the wireless network 200 may also include cells of varying types, sizes, and/or structures. The wireless network 200 may also include BSs that have different transmit power limits, different antenna configurations, and/or utilize different air interface technologies. These and other variations of wireless networks may benefit from the embodiments CSO methods of the present disclosure.

BSs are one of the main energy consumers in a wireless network. It is estimated that about 50% to 80% of the energy consumption in a wireless network takes place in BSs of the wireless network, and that energy consumption of a given BS typically ranges between approximately 0.5 kW and 2 kW. Power consumption of a BS may be divided into two portions, namely, the energy used to transmit signals, and the energy consumed by internal equipment, such as a cooling system, an antenna, etc. The energy used to transmit signals varies according to traffic load, and the energy consumed by internal equipment is generally constant and less dependent on traffic load. The energy consumed by internal equipment generally causes major power consumption of a BS. For example, a BS, at a zero load, may consume about 60-80% of the energy consumed when the BS is at full load.

Traffic behavior in a wireless network may also affect its energy consumption efficiency. One example is that traffic loads among BSs may not always be balanced. For example, 10% of BSs in a wireless network during a period of time may carry about 50-60% of an aggregate traffic load. Thus, although the other 90% of the BSs carry very light traffic load, they are still kept active, and need the same level of maintenance. This greatly reduces energy efficiency. In addition, BSs in a wireless network are generally deployed in order to satisfy the maximum requested capacity at peak hours. However, the BSs are generally underutilized because traffic load may be under that capacity most of a day. This may further reduce energy efficiency and cause a significant waste of energy.

The concept of cell switch-off (CSO) has been proposed as a promising approach to reduce energy consumption in wireless cellular networks. Basically, a CSO approach switches off (or deactivates) one or more base stations based on a pre-defined criteria. Existing CSO approaches may be generally divided into two classes, i.e., a deterministic approach where CSO is done using instantaneous traffic information, and a statistical approach where CSO is done using statistical behavior of traffic. For example, a CSO method may adjust cell sizes according to traffic conditions of the cells. In another example, a CSO method puts BSs in a sleep mode according to quality of service (QoS) and traffic load. Other CSO methods select to switch off a BS according statistical behavior of traffic load, such as daily traffic patterns, average traffic load and spatial traffic distributions.

Figure 3A:
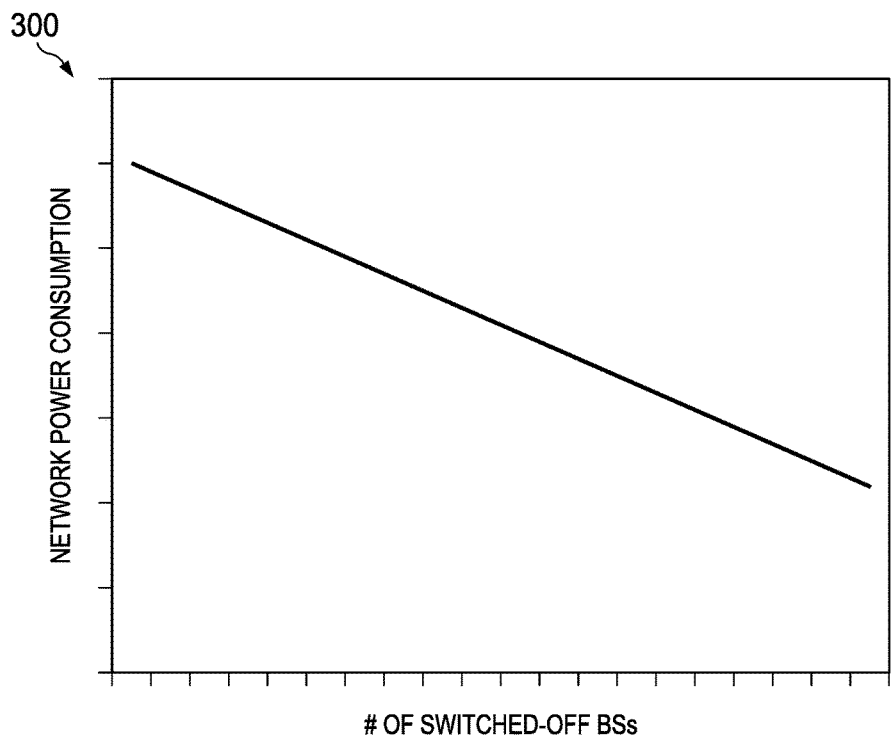
FIG. 3A illustrates a graph of how network power consumption varies as BSs are deactivated.
Figure 3B:
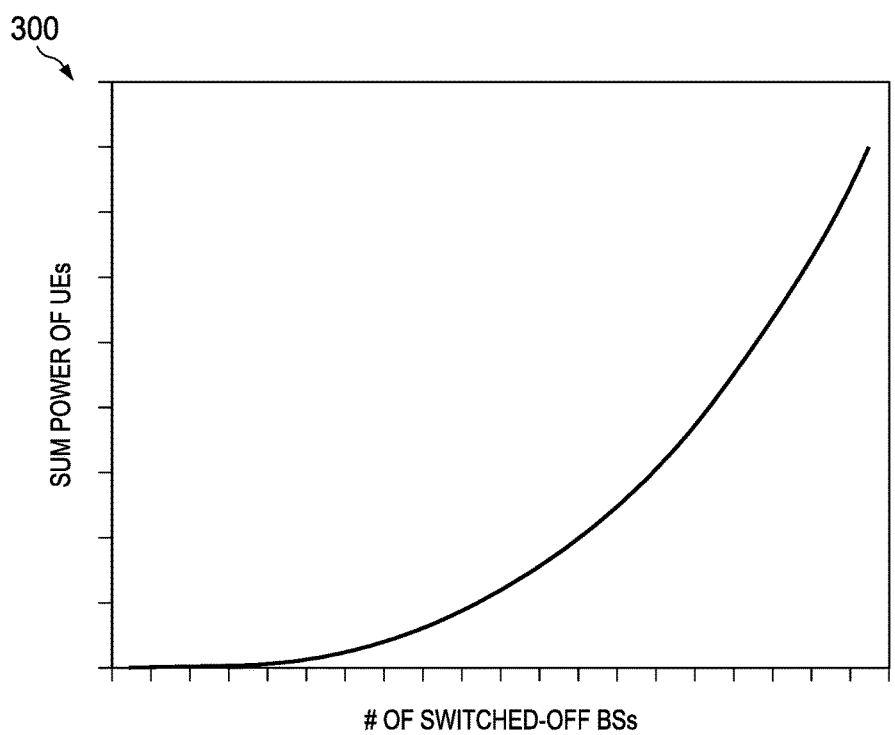
FIG. 3B illustrates a graph of how a sum power of user equipments (UEs) varies as BSs are deactivated.

By re-sizing, or switching off BSs of a wireless network, as described above, energy consumed by BSs is reduced. The energy consumed by BSs may be viewed as power consumption in the downlink direction of the wireless network. However, power consumption of UEs, i.e., energy consumption from the uplink perspectives, is not considered in these approaches. For example, in a so called enhanced cell-zooming algorithm, BSs are sorted according to their traffic loads, and switched off one by one starting from a BS that has the least traffic load until a criteria is satisfied. In this algorithm, when a BS is selected to be switched off, UEs associated with (or served by) this BS (i.e., serving BS) will need to be connected to or associated with a different BS (i.e., target BS) that is not switched off. When the UEs are connected to a target BS that is located farther away from the UEs than the serving BS, power consumption of the UEs may increase. Thus, although downlink power consumption is reduced by switching off BSs, uplink power consumption is instead increased, which may adversely affect the quality of user experience. For example, users may need to charge their mobile phones more often for accessing network services. FIG. 3A and FIG. 3B illustrate graphs 300 of how network power consumption and sum power of UEs varies as BSs are switched off, respectively. As shown, the network power consumption decreases linearly as the number of switched-off BSs increases. However, as the number of switched-off BSs increases, the sum power of UEs is exponentially increased. In some embodiments, switching off BSs of a network may also affect adversely other QoS requirements required by UEs. For example, QoS requirements of some UEs, such as packet loss requirements, latency requirements, jitter requirements, and error rate requirements, may no long be satisfied when a BS is switched off. These and other factors should be taken into account when designing strategies for conserving BS energy consumption and improving network energy efficiency, so that adverse effects on UEs may be mitigated and user experience may be maintained to a desired level.

Figure 4:
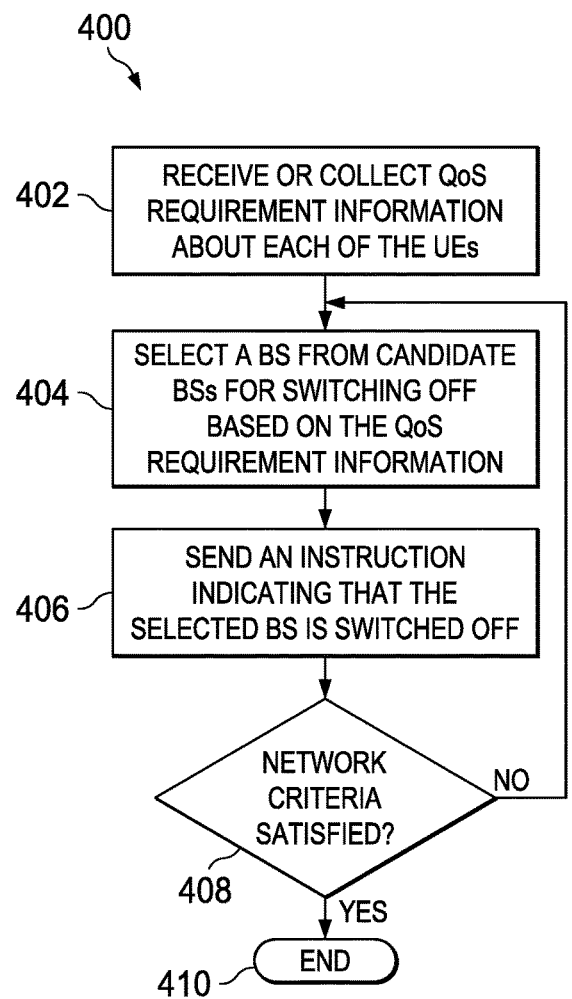
FIG. 4 illustrates a flowchart of an embodiment method for switching off BSs.

FIG. 4 illustrates a flowchart of an embodiment method 400 for switching off BSs in a wireless network serving a plurality of UEs, where QoS requirement information of the UEs is used in determining which BSs to switch off. The plurality of UEs is associated with BSs in the wireless network. The method 400 may be implemented in a centralized fashion. For example, the method 400 is implemented by a network element in the wireless network, such as a BS of the wireless network, a communications controller of the wireless network, or a higher layer network node of the wireless network, or at an operation center, such as a data center. Alternatively, the method 400 may be implemented in a distributed fashion. For example, BSs in the wireless network exchange information with each other, and perform the method 400 to determine whether any of the BSs is selected for switch-off. The method 400 may be performed during some pre-defined time periods and/or when a network criteria is satisfied, e.g., when energy consumption efficiency drops below a threshold, or when the number of unloaded and/or underloaded BSs is greater than a threshold. The wireless network may include a plurality of BSs from which one or more BSs are selected for switching off, and the plurality of BSs are referred to as candidate BSs. The candidate BSs may include all or some of the BSs in the wireless network, and the candidate BSs may be the same or different types of BSs. For example, the candidate BSs include BSs having macro cells (referred to as macro BSs), and/or BSs having small cells (referred to as small BSs). Small BSs may include femtocell BSs, picocell BSs, or microcell BSs. As used herein, a BS is referred to as an active BS if the BS is not switched off and is operating to provide network services to a UE. A BS that is switched off is also referred to as a deactivated BS. A UE associated with a BS refers to a UE that is served by the BS. In the embodiments of the present disclosure, BSs that are witched off and UEs that are in an outage state are not used in calculations and determinations for BS switch-off.

As shown, the method 400 starts with step 402 where the method 400 receives or collects QoS requirement information about each of the UEs in the wireless network. The QoS requirement information may be used to determine whether a candidate BS is selected for switch-off. In one embodiment, the QoS requirement information of a UE includes an uplink transmission rate requirement and a downlink transmission rate requirement. The uplink and downlink transmission rate requirements, such as bit-rate thresholds, may be pre-defined in the UE, or determined based on network services that the UE requests. In one example, the UE requires a fixed uplink and/or downlink rate for data transmissions. In another example, an uplink and/or a downlink transmission rate of an application requested by the UE may be estimated when a request for the application is sent out. Downlink and uplink transmission rate requirements may vary depending on the geographical location of the UE and/or a current rate of the application requested. In another embodiment, the QoS requirement information of a UE includes a transmission power requirement. For example, the transmission power requirement includes a first transmission power threshold indicating a maximum transmission power the UE can use for transmissions. In another example, the transmission power requirement includes a second transmission power threshold indicating a maximum transmission power the UE allows to use for transmissions when a battery power level of the UE is less than a battery threshold. In yet another embodiment, the QoS requirement information of a UE includes a latency requirement and/or a jitter requirement. Similarly, the latency or jitter requirement may be pre-defined or based on network services that the UE requests. Different type of data traffic, such as text messages, voice over IP, or streaming videos, involved in different network services may have different latency or jitter requirements. In yet another embodiment, the QoS requirement information of a UE includes other power related information, such as a remaining battery power level of the UE, and power saving priority level of the UE. When a UE has a very low remaining battery power, switching off a BS that is serving the UE may cause the UE's battery power to decrease more rapidly. Thus, the remaining battery power levels of UEs may be used for determination of BS switch-off. As used herein, the power saving priority is referred to as a priority of a UE, where a continuous network connection of the UE, and/or power saving requirement of the UE, are prioritized in a pre-defined level. For example, when a UE has a highest power saving priority, consideration will be given to this UE to conserve its energy consumption in determining whether a BS serving the UE is switched off. One of ordinary skill in the art would recognize that the QoS requirement information may include any other information of the UEs that may be used in determining which BS is switched off, for reducing impact of the switch-off of BSs on the UEs. The uplink and/or a downlink transmission rate requirement, the transmission power requirement, the latency requirement, the jitter requirement, and other information, such as an error rate requirement and a packet loss requirement, included in the QoS requirement information may be used separately or in combination.

At step 404, the method 400 selects a BS from the candidate BSs of the wireless network for switching off based on the QoS requirement information of the UEs. ABS may be selected to switch off when a criteria is satisfied. In one embodiment, a BS is selected when switching off the BS requires an increment of the total transmission power of the UEs less than a threshold. In another embodiment, a BS is selected for switching off when switching off the BS requires an increment of the total transmission power of the UEs less than increments of the total transmission power of the UEs associated with switching off other candidate BSs. In another embodiment, a BS may be selected when less than a pre-determined number of UEs served by the BS have a remaining battery life less than a threshold. In yet another embodiment, a BS may be selected when less than a pre-defined number of UEs served by the BS have a certain level of power saving priority. In yet another embodiment, a BS may be selected if switching off the BS may cause a UE outage percentage less than a threshold, or may not cause any other active BS to be overloaded. In yet another embodiment, a BS may be selected to switch off, if QoS requirements of at least a threshold of UEs currently served by the BS can be satisfied by the remaining active BSs if the BS was switched off. The QoS requirements include those discussed above with respect to step 402. One of ordinary skill in the art would recognize many variations and alternatives for defining criteria utilizing at least the QoS requirements of the UEs in selecting a BS for switch-off, and different criteria may be defined and used separately or in combination. An embodiment method of selecting a BS from candidate BSs for switch-off will be described in detail later.

At step 406, when a BS is selected for switching off, the method 400 sends an instruction or an indication indicating that the BS is selected for switch off. In response to the instruction or indication, the selected BS performs handoff and implements switch-off. In one embodiment, the method 400 may send a command to the selected BS informing of the selection, and the selected BS will determine how and when to handover UEs that it is serving and to switch off. The command may include timing information specifying a time limit for the switch-off.

The method 400 may further check whether a network criteria is satisfied at step 408, by which, e.g., the method 400 may determine whether more BSs need to be switched off. In one embodiment, the method 400 may check whether a network energy consumption criteria is satisfied after the selected BS is switched off. For example, the method 400 checks whether total energy consumption of active BSs in the network is less than a pre-defined energy consumption threshold. In another embodiment, the method 400 checks whether the number of switched-off BSs in the wireless network is greater than or equal to a threshold. In yet another embodiment, the method 400 checks whether a time window for switching off a BS has expired. In yet another embodiment, the method 400 checks whether the number of switch on/off transitions of the BSs is greater than a threshold. Other criteria may include the number of active BSs in the network that are under-loaded, average energy consumption per active BS, etc. One of ordinary skill in the art would recognize many variations for the network criteria. These criteria may be determined by the service providers and are used separately or in combination. If the network criteria is satisfied, the method 400 ends at step 410. If the network criteria is not satisfied, the method 400 goes back to step 404 and selects another BS from the candidate BSs, excluding the BS that has been switched off. Steps 404-410 may be repeated until the network criteria is satisfied. The method may be referred to as a user-aware CSO method because transmission requirements of UEs are used in selecting BS for switching off.

Figure 5:
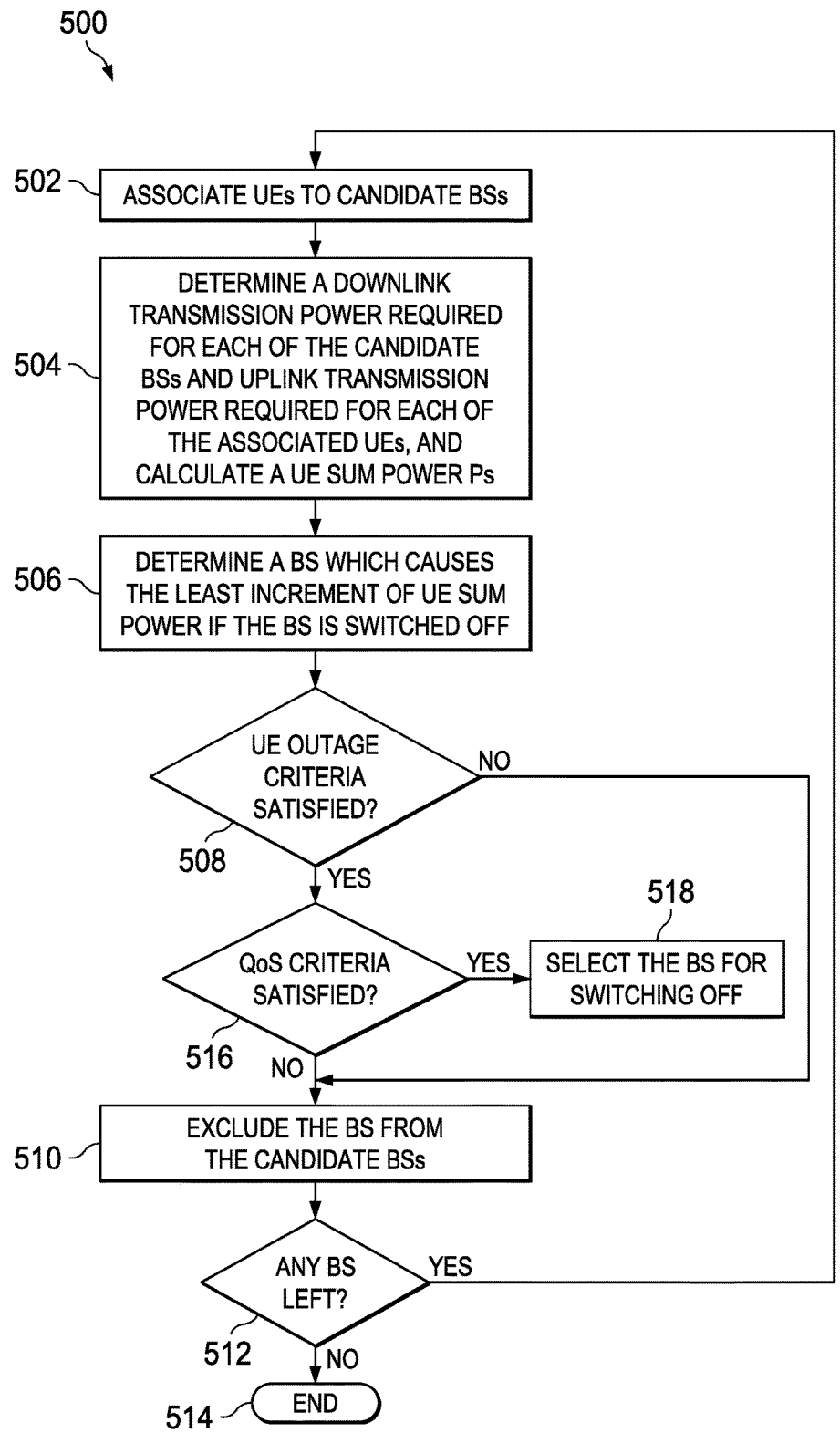
FIG. 5 illustrates a flowchart of another embodiment method for switching off BSs.

FIG. 5 illustrates a flowchart of an embodiment method 500 for switching off BSs in a wireless network. In this example, a BS is selected from candidate BSs for switch-off based on QoS requirement information of UEs served by the candidate BSs. Specifically, candidate BSs are checked, one by one, to determine how much a total transmission power of the UEs is increased if a corresponding candidate BS was switched off. A BS may be selected if the increase in the total transmission power of the UEs is less than a threshold, or is the least. The total transmission power of the UEs is herein referred to as an increment of UE sum power. Although total transmission power of the UEs is used in the embodiment method, other forms of uplink transmission power parameters may also be used, such as an average transmission power. The candidate BSs may be the same type of BSs or different types of BSs.

The method 500 starts with step 502 where the UEs in the cells of the candidate BSs are associated with the candidate BSs. In one embodiment, a UE is associated with a BS if received signal strength of the UE at the BS is the greatest among the candidate BSs. This may be used when the candidate BSs are the same type. In another embodiment, a range expansion (RE) association technique is used to associate the UEs with the candidate BSs. RE association technique may be used where the candidate BSs include different types of BSs, such as macro BSs and small BSs. In this example, strengths of received signals of the UEs at small BSs are multiplied with a constant $\alpha$, where $\alpha>1$, and each of the UEs is associated with a BS which has the greatest received signal strength of the corresponding UE. One of ordinary skill in the art would recognize that other cell association methods or techniques may also be used to associate the UEs with the candidate BSs.

At step 504, the method 500 determines uplink transmission powers and downlink transmission powers required for communications between the UEs and their associated candidate BSs, based on uplink and downlink transmission rate requirements of the UEs. In one embodiment, the downlink or uplink transmission powers are determined by controlling resources allocated for communication to and from each of the UEs. For example, more resources can be allocated to a UE for uplink transmissions so that uplink transmission power required for the UE is reduced. The resources may include frequency, time, or frequency and time resources. For example, the resources may be allocated in a form of resource blocks indicating frequency and time resources. A total downlink transmission power required for each of the candidate BSs may be calculated by summing up downlink transmission powers required for the corresponding BS to communicate with its associated UEs, and may be used to determine whether a corresponding BS has reached its power limitation. Similarly, a UE sum power, i.e., a total uplink transmission power required for the UEs served by the candidate BSs, when no BS is switched off, can be calculated by summing up uplink transmission powers required for the UEs. The UE sum power is represented by $P_S$, and is used to select a BS for switching off. Embodiment methods for determining uplink and downlink transmission powers for the UEs will be described later.

At step 506, the method 500 determines a BS which requires the least increment of UE sum power among the candidate BSs if the BS is switched off. As discussed above, when a BS is switched off, UEs associated with the BS may need increased transmission power to keep connection with the network. This uplink transmission power increase is expected to be as small as possible in order to conserve power consumption of the UEs. An increment of UE sum power when a BS m in the candidate BSs is switched off may be represented by $\Delta P_{S,m} = P_{S,m} - P_S$, where $$P_S = \sum_i^N P_i^U$$

is a weighted sum of transmission powers of the UEs before the BS m is switched off (i.e., none of the candidate BSs is switched off), N is the number of the UEs associated with the candidate BSs, and $P_{S,m}$ is a weighted sum of transmission powers of the UEs after the BS m is switched off.

The method 500 may calculate an increment of UE sum power corresponding to each of the candidate BSs, assuming the corresponding candidate BS is switched off, and select a candidate BS with the least increment of UE sum power for switching off. That is, the method 500 selects a candidate BS which satisfies $$m^* = \underset{m}{\operatorname{argmin}}(\Delta P_{S,m}).$$

For example, when the candidate BSs include three BSs, i.e., BS1, BS2 and BS3, the method 500 may calculate $\Delta P_{S,1}$, $\Delta P_{S,2}$, and $\Delta P_{S,3}$ assuming BS1, BS2 and BS3 are switched off, respectively. If $\Delta P_{S,3}$ has the least value, then BS3 is selected for switching off. In order to calculate a UE sum power increment assuming a BS m is switched off, the method 500 may associate the UEs to the candidate BSs except the BS m, determine uplink transmission powers required for the UEs, and calculate a UE sum power, i.e., $P_{S,m}$, by summing up the determined uplink transmission powers of the UEs. The UE sum power increment is then calculated by subtracting the $P_S$ from the $P_{S,m}$.

The transmission power of the UEs may be weighted based on information such as remaining battery power of the UEs or transmission power requirements of the UEs. For example, a weighting factor for a UE's transmission power may be proportional to the UE's remaining battery power. In another example, a weighting factor for a UE's transmission power may be determined according to the maximally allowed transmission power of the UE. An average uplink transmission power of the UEs, instead of the UE sum power, may also be used to determine how much transmission power would be increased if a BS was switched off.

At step 508, the method 500 determines whether a UE outage criteria is satisfied after switching off the selected candidate BS. A UE may be placed in an outage state in step 504 when none of the candidate BSs can serve the UE. For example, when a BS's available power cannot accommodate all UEs associated with the BS, a UE may be selected and place in outage. The method 500 may check whether a UE outage rate of the wireless network, after the switch-off of the selected candidate BS, is less than a UE outage threshold. If the UE outage rate is not less than the UE outage threshold, i.e., the UE outage criteria is not satisfied, method 500 proceeds to step 510, where the selected candidate BS is excluded from the candidate BSs. The selected candidate BS is excluded from the candidate BSs so that the selected candidate BS will not participate in the selection for BS switch-off, and is not included in the candidate BSs. The method 500 may continue to check whether there is any BS available in the candidate BSs at step 512. If there is no BS available in the candidate BSs, the method 500 ends at step 514, and indicates no BS is selected from the candidate BSs for switching off. If there are still BSs available in the candidate BSs at step 512, the method goes back to step 502 to select another BS for switching off.

When the UE outage criteria is satisfied at step 508, the method 500 may determine that the selected candidate BS will be switched off. Alternatively, the method 500 proceeds to step 516 to check whether one or more other QoS criteria defined based on QoS requirement information of the UEs are satisfied. The QoS requirement information may include those discussed above with respect to FIG. 4. If the QoS criteria is satisfied, the method 500 proceeds to step 518, where the candidate BS is selected for switching off. However, if the QoS criteria is not satisfied, the method 500 proceeds to step 510 where the candidate BS is excluded from switching off.

The QoS criteria may be defined by service providers or operators according to QoS requirements that may be requested by UEs, and are checked by the method 500 using QoS requirement information of UEs collected or received. In one embodiment, a BS may be selected for switching off when less than a threshold number or percentage of UEs being served by the BS have a remaining battery life less than a battery threshold. In yet another embodiment, a BS may be selected for switching off when less than a threshold number or percentage of UEs being served by the BS have a certain level of power saving priority greater than a threshold. In yet another embodiment, a BS may not be selected for switching off when the number or percentage of UEs identified as highly important is greater than a threshold. In some embodiments, service providers or operators may design different service plans or programs according to the different QoS criteria separately or in combination, with different charging schemes. Users may subscribe different plans, paying different plan fees, with their particular QoS requirements met respectively.

Figure 6:
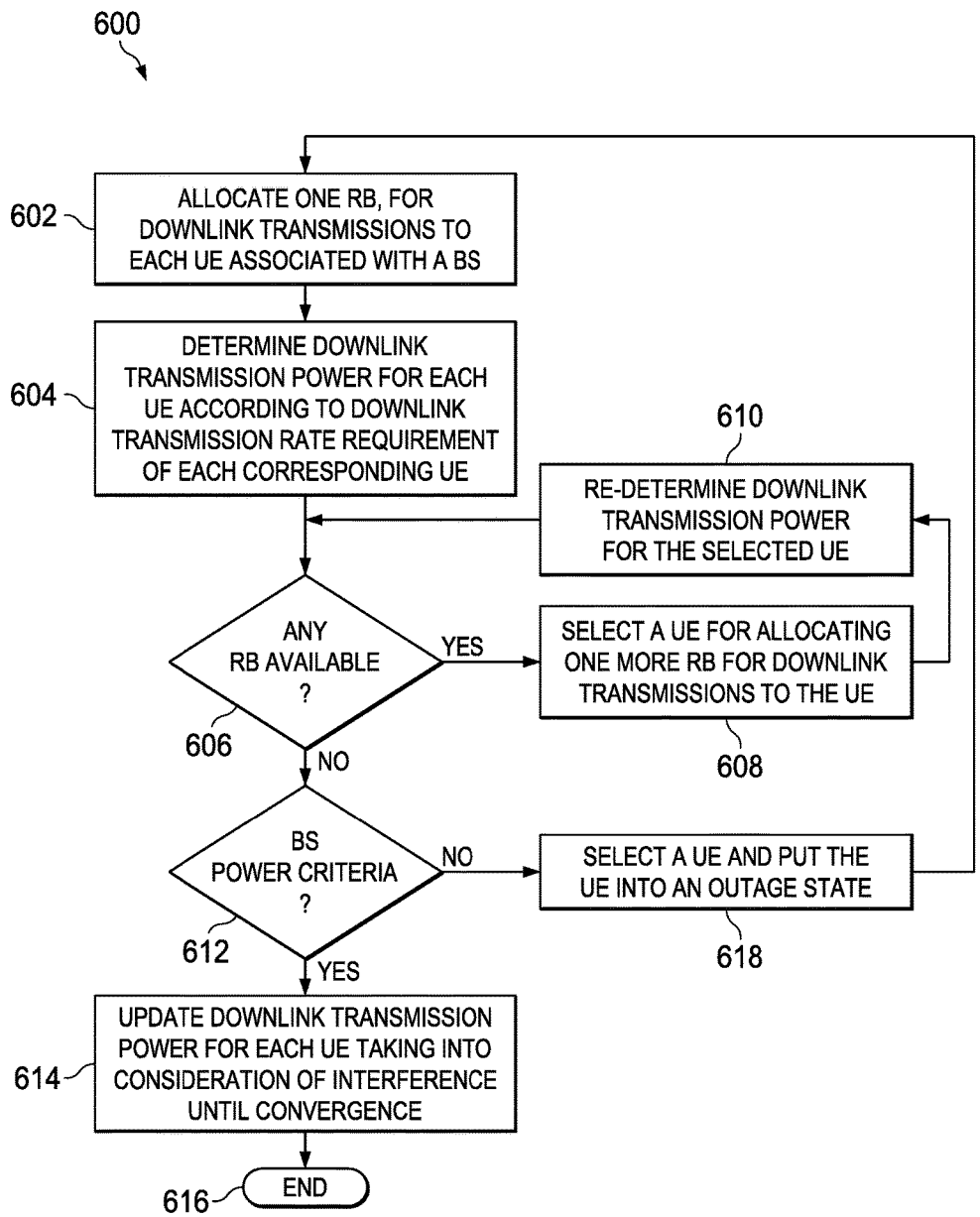
FIG. 6 illustrates a flowchart of an embodiment method for determining downlink transmission powers in a wireless network.

FIG. 6 illustrates a flowchart of an embodiment method 600 for determining downlink transmission powers of a BS for transmissions to UEs associated with the BS in a wireless network. The UEs refer to those that are not in an outage state. In this example, the downlink transmission power of the BS is determined according to resources allocated for downlink transmissions to each of the UEs associated with the BS. Resources are allocated in resource blocks (RBs). The method 600 starts with step 602, where one RB is allocated for transmissions to each of the UEs. At step 604, the method 600 determines a downlink transmission power needed for transmissions to each of the UEs based on a downlink transmission rate requirement of the corresponding UE and the allocated RB. At step 606, the method 600 checks whether there is any RB left for allocation. If there is still one or more RBs available for allocation, the method 600 proceeds to step 608, where it selects a UE for which one more RB is allocated for downlink transmissions. In one embodiment, a UE may be randomly selected. In another embodiment, a UE may be selected according to its priority level. For example, a UE with a higher power saving priority level may be selected with priority for allocating more downlink RBs. In another embodiment, a UE may be selected if allocating the one more RB for downlink transmissions to this UE causes the greatest transmission power decrement of the BS. For example, the method 600 may calculate a downlink transmission power needed for each of the UEs before and after one more RB is allocated to each corresponding UE, respectively, and calculate the difference between the downlink transmission powers before and after the one more RB is allocated. A UE corresponding to a greatest difference is selected for which one more downlink RBs will be allocated. In this example, downlink RBs are allocated such that the total downlink transmission power of the BS may be reduced for performing downlink transmissions to the UEs. At step 610, the method 600 re-determines the downlink transmission power required for the selected UE with the one more RB allocated. The method 600 then repeat steps 606, 608 and 610 until all available RBs are allocated.

When there is no more RB available for allocation at step 606, the method 600 proceeds to determine whether a BS power criteria is satisfied at step 612. The BS power criteria may include whether the total downlink transmission power of the BS allocated is less than an available transmission power of the BS, or a power threshold. The BS power criteria may also include whether the greatest downlink transmission power allocated to a UE is less than a pre-defined threshold. One of ordinary skill in the art would recognize many variations to define the BS power criteria, and the BS power criteria may be used separately or in combination to determine whether downlink transmission power requirements of each BS are accommodated. If the BS power criteria is satisfied, the method 600 goes to step 614, where downlink transmission power for each UE is adjusted taking into consideration of interferences. In one example, it is assumed that each UE in a wireless network causes interference randomly on any other UEs in the network. The method 600 then ends at step 616. If the BS power criteria is not satisfied at step 612, the method 600 proceeds to step 618, where a UE is selected and put into an outage state. Then, the method 600 goes back to step 602, reallocating the downlink resources and determining downlink transmission powers excluding the outage UE. The UE may be selected for outage according to an outage criteria. For example, a UE that has a maximum path loss may be selected. In another example, a UE that requires the greatest downlink transmission power may be selected. Other mechanisms may also be used to select such a UE so that downlink resources and transmission power are determined with the BS power criteria satisfied.

Figure 7:
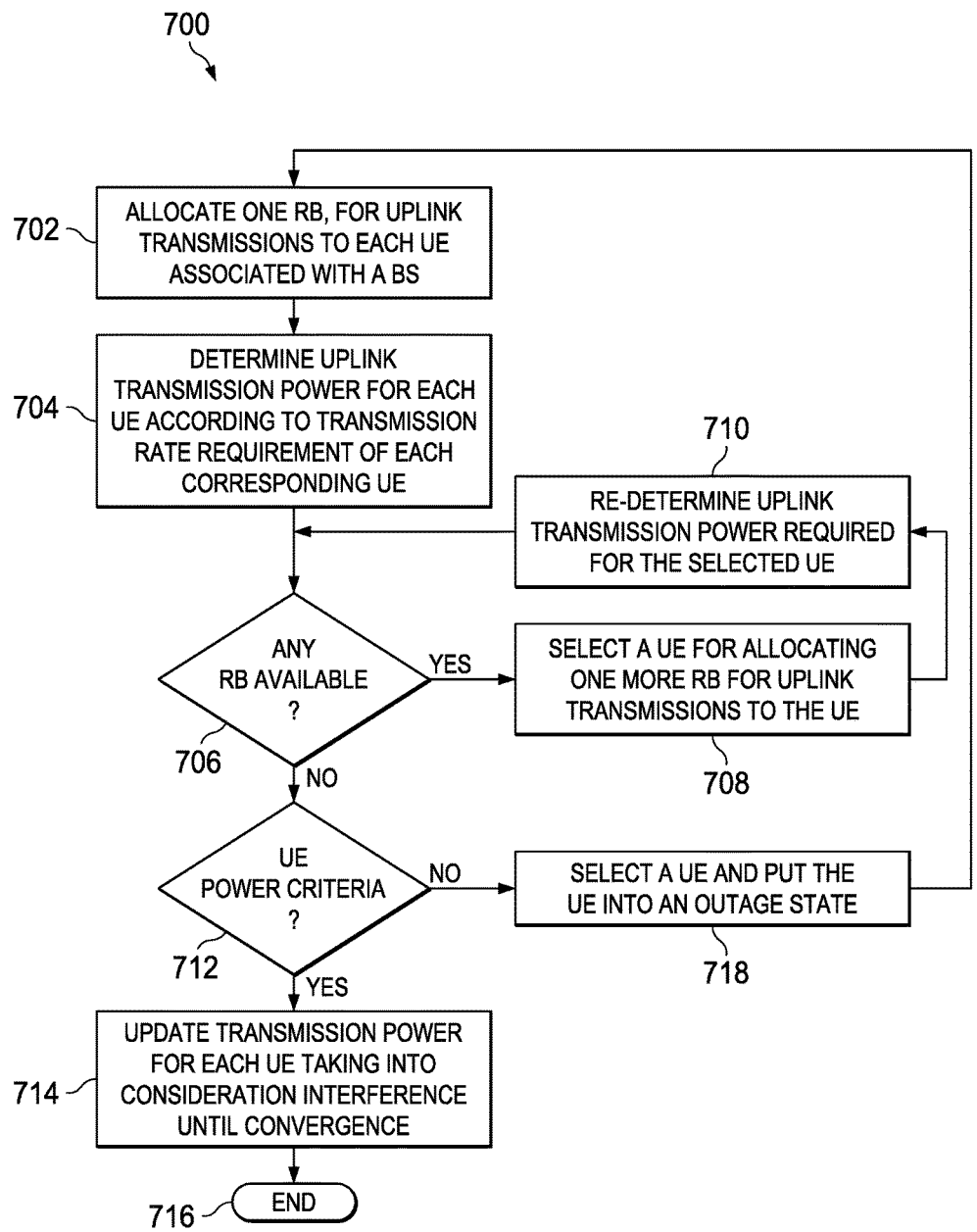
FIG. 7 illustrates a flowchart of an embodiment method for determining uplink transmission powers in a wireless network.

FIG. 7 illustrates a flowchart of an embodiment method 700 for determining uplink transmission powers of UEs associated with a BS in a wireless network. In this example, the UEs refer to those that are not in an outage state, and uplink transmission powers required for the UEs are determined according to uplink RBs allocated to the UEs and uplink transmission rate requirements of the UEs. The method 700 starts with step 702, where one RB is allocated to each of the UEs associated with the BS. At step 704, the method 700 determines uplink transmission power required for transmissions from each of the UEs to the BS, based on transmission rate requirement of the corresponding UE and the allocated RB. At step 706, the method 700 checks whether there is any RB left for allocation. If there is still at least one RB available for allocation, the method 700 proceeds to step 708, where the method 700 selects a UE for which one more RB is allocated for uplink transmissions. In one embodiment, a UE may be randomly selected. In another embodiment, a UE may be selected which has the highest power saving priority. For example, a UE may be assigned a power saving priority where only a transmission power less than a threshold is allowed for uplink transmission. The one more RB may be allocated to this UE, so that its transmission power requirement may be accommodated. In another embodiment, a UE may be selected if allocating one more RB for this UE results in the greatest transmission power decrement among the UEs. For example, the method 700 may determine, for each of the UEs, an uplink transmission power decrement by calculating uplink transmission powers required for the corresponding UE before and after one more RB is allocated. A UE is selected corresponding to the greatest uplink transmission power decrement and one more RB will be allocated to this UE. In this example, uplink RBs are allocated for the UEs in a way such that uplink transmission powers required for the UEs are reduced and transmission rate requirements of the UEs are accommodated. The uplink transmission powers of the UEs may be weighted transmission power, and weighting factors for the UEs may be determined in accordance with power related requirements of the UEs, such as transmission power requirements, and power saving priority. At step 710, the method 700 re-determines the uplink transmission power required for the selected UE with one more RB allocated. The method 700 repeat steps 706, 708 and 710 until all available RBs are allocated.

If there is no more RB available for allocation at step 706, the method 700 proceeds to check, for each of the UEs, whether a UE power criteria is satisfied at step 712. The UE power criteria may be defined according to the QoS requirement information of the UEs, and may be different for different UEs. For example, a UE power criteria is whether transmission power determined for a UE is less than a maximum transmission power threshold. If the UE power criteria is satisfied, the method 700 goes to step 714, where uplink transmission power of each UE is adjusted taking into consideration of interferences. In one example, it is assumed that each UE in a wireless network causes interference randomly on any other UEs in the network. The method 700 then ends at step 716. If the UE power criteria is not satisfied, at step 718, the method 700 selects a UE, puts it into an outage state, and goes back to step 702, re-determining the uplink transmission powers of the UEs excluding the selected outage UE. A UE may be selected for outage according to an outage criteria. For example, a UE that has a maximum path loss is selected. In another example, a UE that requires an uplink transmission power greater than its maximum transmission power threshold is selected. Other mechanisms may also be used to select such a UE so that uplink resources and transmission power are determined and the UE power criteria is satisfied.

Figure 8:
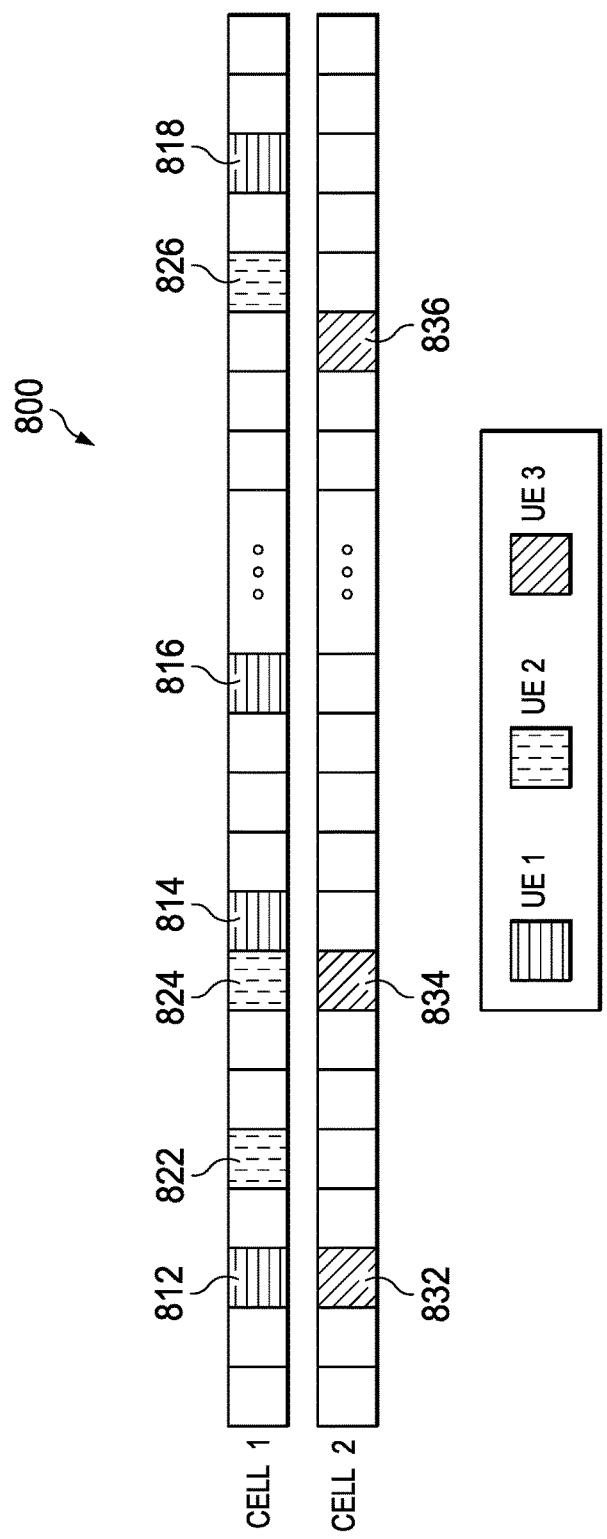
FIG. 8 illustrates a diagram of resource block allocation in cellular coverage areas.

FIG. 8 illustrates RBs allocated to three UEs, namely, UE 1, UE 2 and UE 3. UE 1 and UE 2 are in the coverage of cell 1, and UE 3 is in the coverage of cell 2. In this example, the RBs allocated to each of the UEs is determined in accordance with the method 600 or 700 above, and are assigned to the UEs randomly. As shown, cell 1 assigns RBs 812, 814, 816 and 818 to UE 1, and RBs 822, 824 and 826 to UE 2. Cell 2 assigns RBs 832, 834 and 836 to UE 3. It can be seen that UE 1 and UE 3 are interfering with each other in RBs 812 and 832, and UE 2 and UE 3 are interfering with each other in RBs 824 and 834. However these RBs are randomly assigned regardless of the interference.

Table 1 shows an embodiment algorithm (Algorithm 1) for determining transmission powers for downlink transmissions to UEs associated with a BS m according to the method described with respect to FIG. 6. One of ordinary skill in the art would recognize that a similar algorithm may be used for determining transmission powers for uplink transmissions according to the method described with respect to FIG. 7. Table 2 shows an embodiment algorithm (Algorithm 2) for selecting one or more BSs from candidate BSs, i.e., a set of picocell BSs, for switch-off, utilizing Algorithm 1 to determine the downlink transmission powers for UEs. Definitions of variables used in Algorithm 1 and Algorithm 2 are given in Table 3.

TABLE 1

Algorithm 1

Input: Received signal powers of UTs of Bs m
Output: $B_{m,i}^D$, $P_{m,i}^D$ $\forall i \in S_m$
1: $k_{m,i}^D = 1$, $\forall i \in S_m$
2: Loop
3:    Calculate $P_{m,i}^D$, $\forall i \in S_m$
4:    $k_m^D = \Sigma_{i \in S_m} k_{m,i}^D$
5:    if ($k_m^D < K$) then
6:      $\hat{k}_{m,i}^D = k_{m,i}^D + 1$, $\forall i \in S_m$
7:      Calculate $\hat{P}_{m,i}^D$, $\forall i \in S_m$ dependent on $\hat{k}_{m,i}^D$
8:
$$i_{sel} = \underset{i \in S_m}{\arg\max}(P_{m,i}^D - \hat{P}_{m,i}^D)$$
9:      $k_{m,i}^D = \hat{k}_{m,i}^D$ for $i_{sel}$
10:    else
11:      if ($P_m^D \leq P_{BS}$) then
12:        break Loop
13:      else
14:        Block the UT ($i_b$) which has minimum received power
15:        $S_m = S_m - \{i_b\}$.
16:        Initialize: $k_{m,i}^D = 1$, $\forall i \in S_m$
17:      end
18:    end
19: End Loop

TABLE 2

Algorithm 2

Input: W
Output: X, $B^D$, $B^U$, $P^D$, $P^U$
1: X ← 0
2: $P_{dif}$ ← 0
3: T ← Set of all the pico BSs.
4: Associate each UT i with BS m which has the highest $w_{m,i}^D$.
5: Update X.
6: Find $B^D$, $P^D$, $B^U$ and $P^U$ using Algorithm 1 (Power control algorithm).
7: while T ≠ 0 do
8:    for each BS j ∈ T do
9:      Assume BS j is switched-off.
10:      Re-associate $S_j$ with the neighbour BSs which have the highest biased received signal power.
11:      Find $B^D$, $P^D$, $B^U$ and $P^U$ by the help of Algorithm 1.
12:      Calculate the sum of UTs power.
13:    end
14:    Update $P_{dif}$.
15:    Select cell m with smallest $P_{dif}$.
16:    Re-associate $S_m$ with the neighbour BSs which have the highest biased received signal power.
17:    If (outage constrained is satisfied) then
18:      Switch-off BS m.
19:      Update X.
20:      Update $B^D$, $P^D$, $B^U$ and $P^U$ using Algorithm 1.
21:      A = A - {m}.
22:      T = T - {m}.
23:    else
24:      T = T - {m}.
25:    end
26: end

TABLE 3

$X = [x_{m,i}]_{N \times N_A}$ where $x_{m,i} \in \{0,1\}$. $x_{m,i}$ is a variable that takes 1 when BS m is associated with UT i and takes 0 otherwise.
$W = [w_{m,i}^D]_{N \times N_A}$ where $w_{m,i}^D$ is the biased received signal power of UT i when the signal is sent from BS m. It is "biased" because received signal power for pico BSs is multiplied by a constant larger than 1 (range expansion technique [12]).
$B^D = [B_{m,i}^D]_{N \times N_A}$ shows the allocated bandwidths for DL.

TABLE 3-continued $B^U = [B_{m,i}^U]_{N \times N_A}$ shows the allocated bandwidths for UL.
$P^D = [P_{m,i}^D]_{N \times N_A}$ shows the allocated powers of BSs for DL.
$P^U = [P_i^U]_{N \times 1}$ shows the power levels of UTs.
$P_{dif} = [\Delta P_{S,m}]_{1 \times N_A}$ where $\Delta P_{S,m}$ shows the sum power change of whole UTs when BS m is switched off.

Figure 9A:
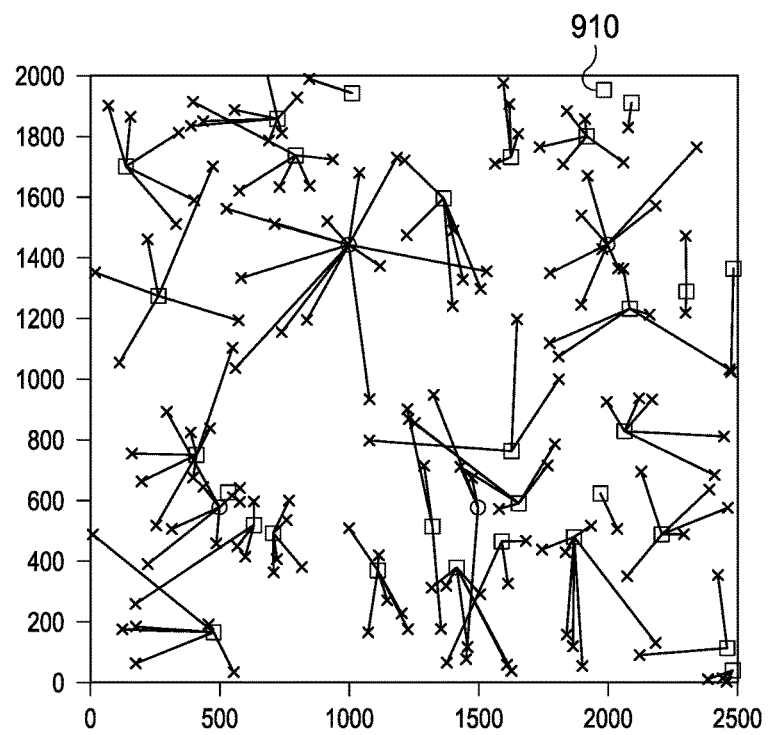
FIG. 9A illustrates a diagram of an embodiment wireless network with UEs associated with BSs before BSs are switched off.
Figure 9B:
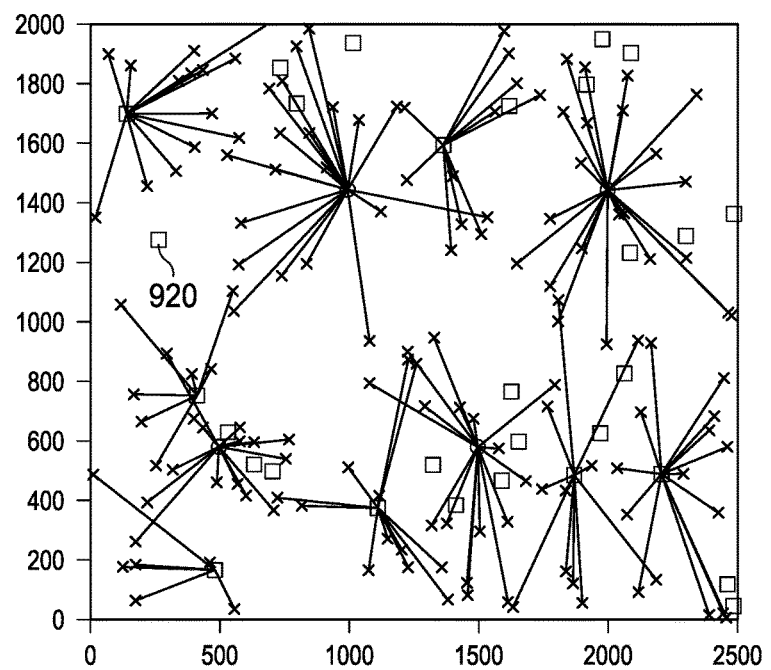
FIG. 9B illustrates a diagram of an embodiment wireless network with UEs associated with BSs after BSs are switched off.

FIG. 9A and FIG. 9B illustrate a diagram of an embodiment wireless network with UEs associated with BSs in the wireless network before and after some of the BSs are switched off using the embodiment methods, respectively. In this example, the wireless network includes four macro BSs and 30 active picocell BSs. Each of the macro BSs has a hexagonal grid, and distance between any two macro BSs is 1000 m. The picocell BSs are distributed according to a Poisson point process (PPP). Only the picocell BSs are candidates for switching off, and the macro BSs are always active. 150 UEs are uniformly distributed in the wireless network, i.e., the coefficient of variation (CoV) is 1. The CoV is used to indicate the level of heterogeneity. Downlink transmission rate required is 500 kbps and uplink transmission rate required is 300 kbps. The UEs are associated with the BSs, either a macro BS or a picocell BS, using the range expansion technique and the range expansion coefficient is 10 in this example.

As shown in FIGS. 9A-9B, the macro BSs are represented by round-shaped dots, and the picocell BSs are represented by square-shaped dots. FIG. 9A illustrates the association of the 150 UEs with the BSs when all of the BSs in the wireless network are active. In FIG. 9A, every picocell BS is active, regardless whether it has any UE associated with it or not. For example, picocell BS 910 does not have any UE associated, but it is still active. FIG. 9B illustrates the association of the 150 UEs after twenty three picocell BSs are switched off using the embodiment methods as illustrated with respect to FIGS. 4 and 5. In FIG. 9B, picocell BSs that don't have any UE associated indicate that they are switched off. As shown, the unloaded picocell BS 910 in FIG. 9A is selected to switch off in FIG. 9B. FIG. 9B also shows that UEs that were associated with the switched-off picocell BSs, such as picocell BS 920, are now associated with neighboring BSs of the switched-off picocell BSs.

Figure 10A:
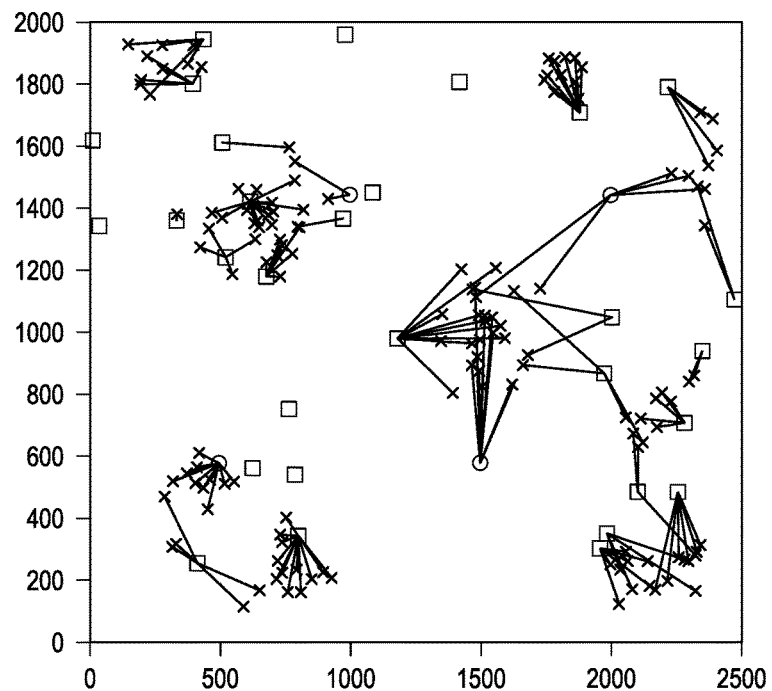
FIG. 10A illustrates a diagram of another embodiment wireless network with UEs associated with BSs before BSs are switched off.
Figure 10B:
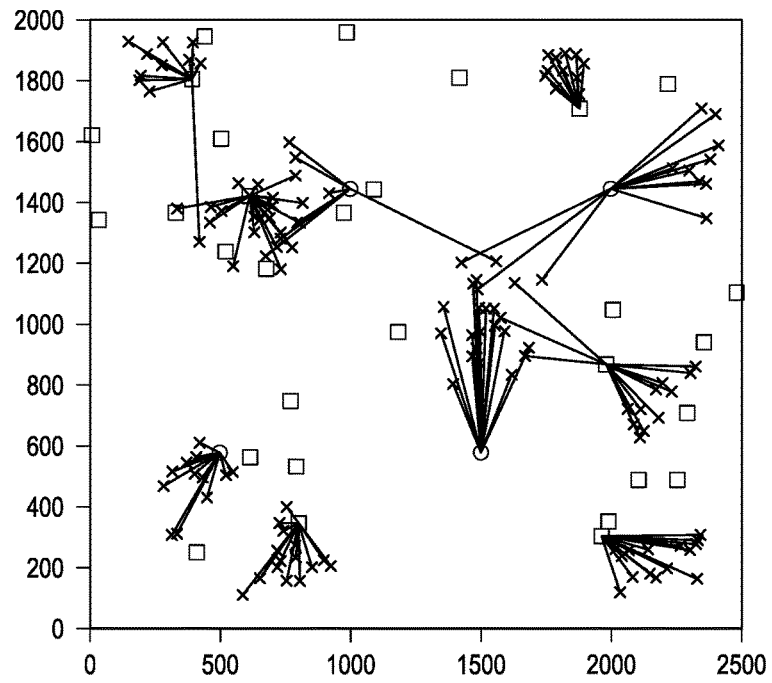
FIG. 10B illustrates a diagram of another embodiment wireless network with UEs associated with BSs after BSs are switched off.

FIG. 10A and FIG. 10B illustrate a diagram of another embodiment wireless network with UEs associated with BSs in the wireless network before and after some of the BSs are switched off, respectively. In this example, the wireless network has the similar layout configuration as that in FIGS. 9A-9B. The wireless network includes four macro BSs and 30 active picocell BSs. The macro BSs are represented by round-shaped dots, and the picocell BSs are represented by square-shaped dots. Each of the macro BSs has a hexagonal grid, and distance between any two macro BSs is 1000 m. The picocell BSs are distributed according to a Poisson point process (PPP). Only the picocell BSs are selected for switch-off, and the macro BSs are always active. Transmission rate required is 500 kbps for downlink transmissions and 300 kbps for uplink transmissions. 150 UEs are associated with the BSs, either a macro BS or a picocell BS, using the range expansion technique and the range expansion coefficient is 10. However, the 150 UEs are distributed in the wireless network in clusters, and the CoV is 2. FIG. 10A illustrates the association of the 150 UEs with the BSs when all of the BSs in the wireless network are active. FIG. 10B illustrates the association of the 150 UEs with the BSs after twenty four picocell BSs are switched off using the embodiment methods as illustrated with respect to FIGS. 4 and 5.

Figure 11:
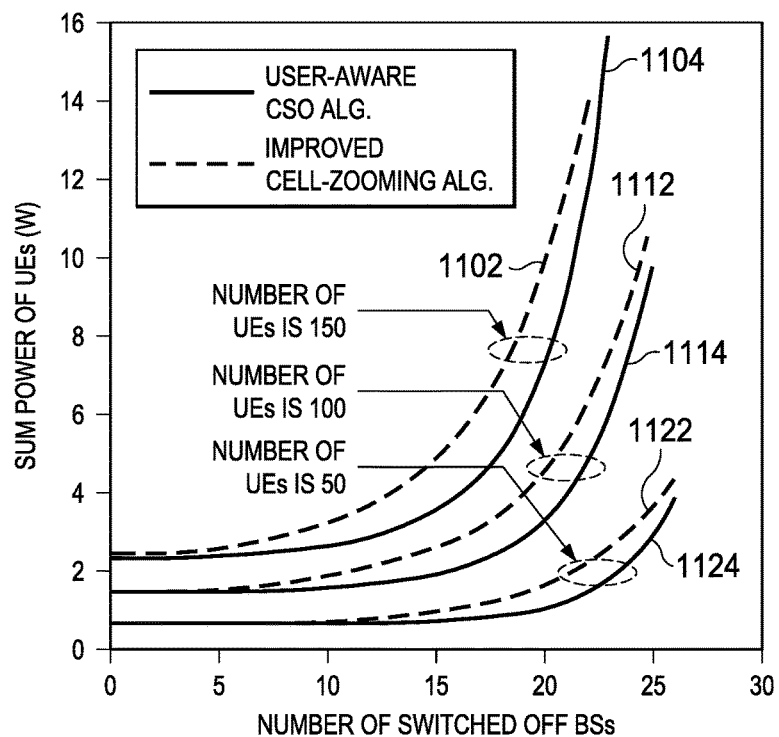
FIG. 11 illustrates a graph of relationships between the sum power of UEs and the number of switched-off BSs for different numbers of UEs.

FIG. 11 illustrates a graph of relationships between sum power of UEs and the number of switched-off BSs for different numbers of UEs. The sum power of UEs is referred to as the total transmission power of the UEs required for uplink transmissions. In this example, UEs are uniformly distributed in a wireless network including 4 macro BSs and 30 picocell BSs. Switched-off BSs are selected from the picocell BSs. The dashed-line curves indicate that BSs are switched off using a so call improved cell-zooming algorithm, and the solid-line curves indicate that BSs are switched off using the embodiment methods described with respect to FIGS. 4 and 5. Curves 1102 and 1104 represent the relationship when the number of UEs in the network is 150, curves 1112 and 1114 represent the relationship when the number of UEs is 100, and curves 1122 and 1124 represent the relationship when the number of UEs is 50. As shown, with the same number of switched-off BSs, curves 1104, 1114 and 1124 indicate a lower sum power of UEs, compared with curves 1102, 1112 and 1122. In other words, the embodiment methods of the present disclosure require less total transmission power of UEs than the improved cell-zooming algorithm when switching off the same number of BSs. For example, with 15 BSs switched off, curve 1104 requires about 3.75 W of total transmission power for the 150 UEs, while curve 1102 requires about 4.5 W. FIG. 11 also shows that more BSs can be switched off using the embodiment methods than the improved cell-zooming algorithm without increasing total transmission power for UEs. For example, about 13 BSs are switched off using the improved cell-zooming algorithm and the total transmission power required for UEs is about 4 W. In contrast, about 17 BSs can be switched off using the embodiment methods and the total transmission power required for UEs can still be kept at about 4 W.

Figure 12:
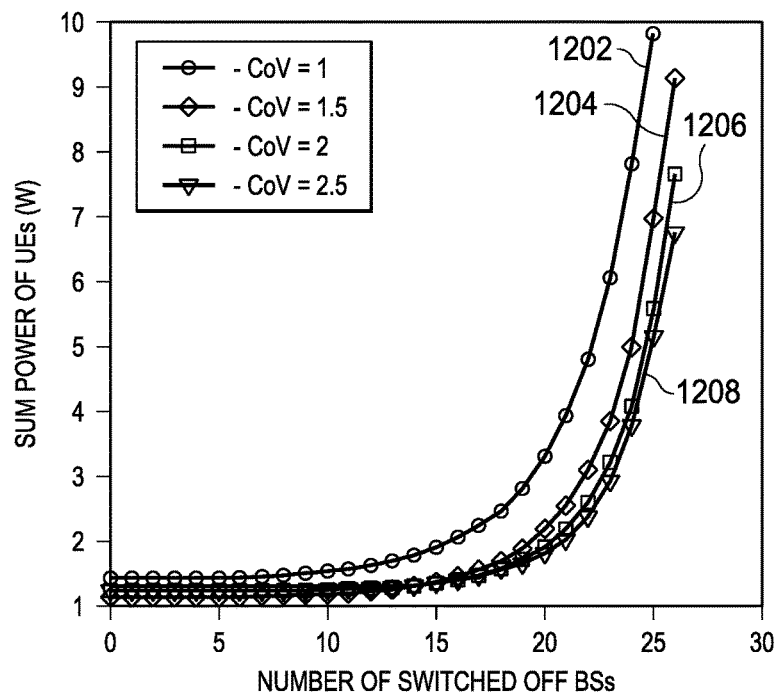
FIG. 12 illustrates a graph of relationships between the sum power of UEs and the number of switched-off BSs for different coefficient of variation (CoV)

FIG. 12 illustrates a graph of relationships between sum power of UEs and the number of switched-off BSs for different CoVs. In this example, 100 UEs are distributed in a wireless network including 4 macro BSs and 30 picocell BSs. Switched-off BSs are selected from the picocell BSs. The 100 UEs are distributed uniformly or in clusters, depending on the value of CoV. Curves 1202, 1204, 1206 and 1208 represent the relationship when CoV is 1, 1.5, 2 and 2.5, respectively. As shown, with the same number of switched-off BSs, the sum power of UEs required for uplink transmissions decreases with the increase of the value of CoV, i.e., the heterogeneity level of traffic.

Figure 13:
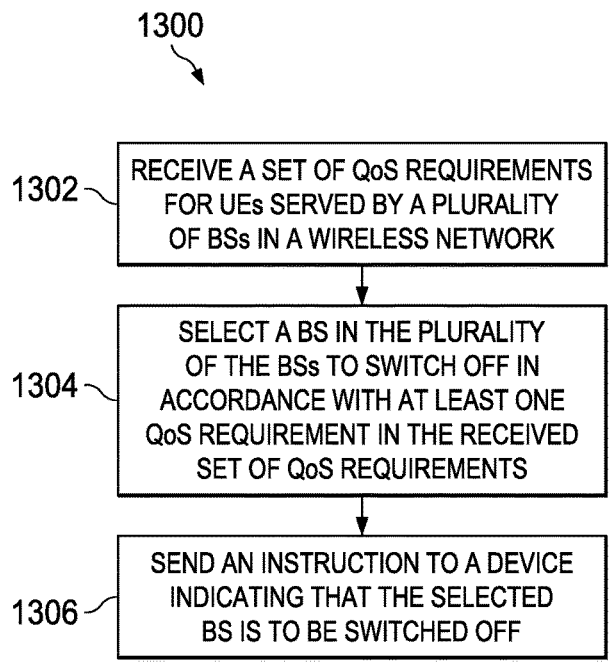
FIG. 13 illustrates a flowchart of an embodiment method for switching off a BS.

FIG. 13 illustrates a flowchart of an embodiment method 1300 for switching off a BS. At step 1302, the method 1300 receives a set of QoS requirements for UEs served by a plurality of BSs in a wireless network. At step 1304, the method 1300 selects a BS in the plurality of the BSs to switch off in accordance with at least one QoS requirement in the received set of QoS requirements. At step 1306, the method 1300 sends an instruction to a device indicating that the selected BS is to be switched off. The device may be one of the plurality of BSs or a communications controller.

In one embodiment, the method 1300 may estimates, based on the at least one QoS requirement in the received set of QoS requirements, how much an uplink transmission power parameter associated with switching off the given BS would need to be increased if the given BS was switched off, and selects the given BS to switch off when the estimated increase in the uplink transmission power parameter for switching off the given BS satisfies a criteria. The uplink transmission power level may correspond to a total or average uplink transmission power level of the UEs served by the BSs. In one embodiment, the criteria may be satisfied when the estimated increase in the uplink transmission power level for switching off the given BS is less than a threshold. In another embodiment, the criteria may be satisfied when the estimated increase in the uplink transmission power level for switching off the given BS is less than an estimated increase in the uplink transmission power level for switching off any other BS in the BSs. In one embodiment, the BS may be selected when QoS requirements of at least a threshold number of UEs being served by the BS are satisfied if the BS was switched off. The QoS requirements may include latency requirements, uplink or downlink bit-rate requirements, transmission power requirements, jitter requirements, packet loss requirements, or error rate requirements. In yet another embodiment, the BS may be selected when a threshold number of UEs being served by the BS have at least a minimum amount of stored battery power. In yet another embodiment, the BS is selected when a threshold number of UEs being served by the BS are not classified as prioritized power saving UEs.

Figure 14:
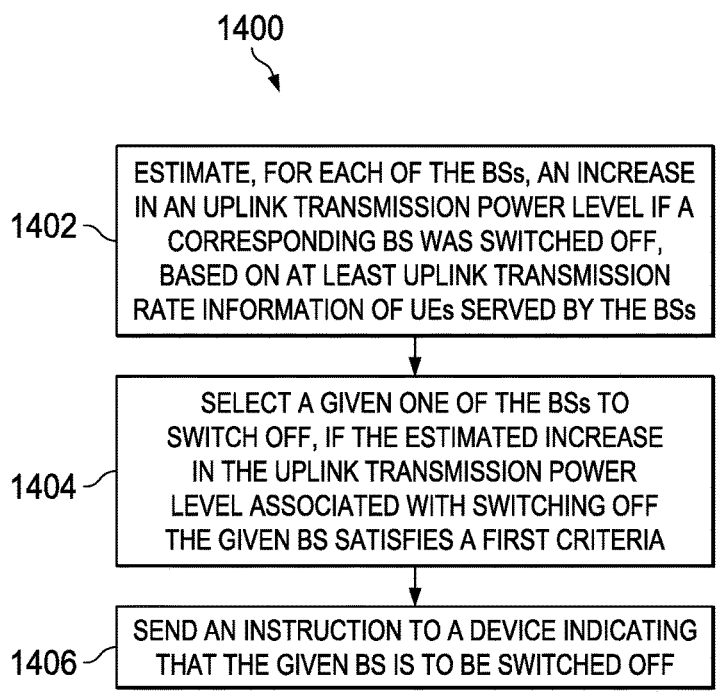
FIG. 14 illustrates a flowchart of another embodiment method for switching off a BS.

FIG. 14 illustrates a flowchart of another embodiment method 1400 for switching off BSs in a wireless network. At step 1402, the method 1400 estimates, for each of the BSs, an increase in an uplink transmission power level if a corresponding BS was switched off, based on at least uplink transmission rate information of UEs served by the BSs. The increase in the uplink transmission power level is associated with switching off the corresponding BS. At step 1404, the method 1400 selects a given one of the BSs to switch off, if the estimated increase in the uplink transmission power level associated with switching off the given BS satisfies a first criteria. At step 1406, the method 1400 sends an instruction to a device indicating that the given BS is to be switched off. The uplink transmission power level may correspond to a total or average uplink transmission power level of the UEs served by the BSs. In one embodiment, the first criteria may be satisfied when the estimated increase in the uplink transmission power level associated with switching off the given BS is less than an estimated increase in the uplink transmission power level associated with switching off any other BS in the BSs. In another embodiment, the given BS may be selected to switch off if the first criteria and a second criteria are satisfied. The second criteria may be satisfied if at least a threshold number of UEs being served by the given BS have at least a minimum amount of stored battery power, or at least a threshold number of UEs being served by the given BS are not classified as prioritized power saving UEs. Alternatively, the second criteria may be satisfied if a UE outage rate of the wireless network is less than a threshold if the given BS was switched off. In another embodiment, the second criteria may be satisfied if QoS requirements of at least a threshold number of UEs being served by the given BS are satisfied if the given BS was switched off.

The following descriptions and embodiments should not be interpreted to limit the scope of the claimed invention. In some embodiment, a network may include heterogeneous BSs and UEs. For example, a network may include macro and picocell BSs where macro BSs are placed on a regular hexagonal grid in a deterministic manner and picocell BSs are modeled as a Poisson Point Process (PPP). A CSO process may be performed only for the picocell BSs, and macro BSs are always active. Snapshot approach may be adopted, where a snapshot of the network is taken at a certain time to determine which BSs will be switched off. A full buffer traffic model may be used where UEs in the network always receive and transmit data. As discussed above, for a typical BS, a constant power, which is independent of transmission power of equipments like cooling system, and antennas, dominates the total power consumption of the BS. Therefore, the total network power may be estimated roughly to be proportional to the number of active BSs in the network. Definitions of variables that will be used in the following descriptions are given in Table 4.

TABLE 4

| | |
|---|---|
| $R_{dl}$ | Fixed data rate for downlink |
| $R_{ul}$ | Fixed data rate for uplink |
| A | Set of active BSs |
| $S_m$ | Set of UEs associated with BS m. |
| $P_{BS}$ | Maximum transmission power of a BS |
| $B_{BS}$ | Total bandwidth for a BS |
| K | Number of RBs for a BS |
| N | Number of all UEs |
| M | Number of BSs |
| $N_A$ | Number of active BSs |
| $B_{m,i}^D$ | Allocated downlink bandwidth of the BS m for UE i |
| $B_{m,i}^U$ | Allocated uplink bandwidth of the BS m for UE i |
| $P_{m,i}^D$ | Transmission power of the BS m for UE i |
| $B_m^D$ | Total bandwidth of the BS m for downlink |
| $B_m^U$ | Total bandwidth of the BS m for uplink |
| $P_m^D$ | Total transmission power of the BS m |
| $PL(d_{m,i})$ | Path loss between BS m and UE i |
| $P_i^U$ | Transmission power of UE i |
| $P_{max}^U$ | Maximum transmission power of a UE |

In one embodiment, a LTE network which uses discrete bandwidth allocation is considered. All UEs have the same rate requirement which need be fulfilled by the LTE network, otherwise the UE is assumed to be in the outage state and is blocked. An achievable downlink rate for UE i can be given as:

$$R_{m,i}^D = B_{m,i}^D \log\left(1 + \frac{P_{m,i}^D / PL(d_{m,i})}{I_i^D + N_0 N_f B_{m,i}^D}\right), \quad (1)$$

where $I_i^D$ is the interference at the UE i, $N_f$ is the receiver noise figure, $N_0$ is the noise power spectral density. The path loss term $PL(d_{m,i})$ contains large scale statistics as path loss and log-normal shadowing. The path loss term can be expressed as $PL(d_{m,i})=c+10n \log(d_{m,i})+X_\sigma$, where c is the power loss at 1 meter away from the transmitter, n is the path loss coefficient, and $X_\sigma$ is added due to a shadowing effect which is a zero-mean Gaussian distributed random variable with a standard deviation $\sigma$. When the achievable downlink rate of a UE is less than the downlink rate requirement, i.e., when $R_{m,i}^D<R_{dl}$, the UE is blocked. Similarly, an achievable uplink rate for UE i can be given as:

$$R_{m,i}^U = B_{m,i}^U \log\left(1 + \frac{P_i^U / PL(d_{m,i})}{I_i^U + N_0 N_f B_{m,i}^U}\right) \quad (2)$$

where $I_i^U$ is the interference for the UE i. When $R_{m,i}^U<R_{ul}$, the UE is blocked.

Performance of a CSO method may be related with the spatial distribution of traffic. When BSs are heterogeneous and UE locations are heterogeneous, performance of a CSO method may be analyzed under different heterogeneity levels of traffic load. A heterogeneous spatial traffic modeling may be used which allows statistical adjustment and defines a metric, coefficient of variation (CoV). CoV represents the heterogeneity level of traffic load, and is defined as $\sigma_t/\mu_t$, where t is the traffic measure, $\sigma_t$ is the standard deviation of t, and $\mu_t$ is the mean of t. There are some different approaches for t, and we consider the mean value of the lengths of Delaunay edges of every UE as traffic measure. CoV is set to 1 when UEs are distributed based on PPP and normalization of CoV is done with reference to PPP.

Downlink power control and uplink power control are generally performed independently in a cellular network. In some embodiments, downlink power control may be performed with an objective to decrease the total downlink power consumption. The optimization problem to determine resource (RB and power) allocation for whole network may be written as:

$$\text{minimize} \quad \sum_{m \in A} P_m^D \quad (3)$$

$$\text{subject to} \quad P_m^D \leq B_{BS}, \quad \forall m \in A,$$

$$k_m^D \leq K, \quad \forall m \in A,$$

$$R_{m,i}^D \geq R_D, \quad \forall m \in A,$$

$$P_m^D \leq B_{BS}, \quad \forall m \in A, \forall i \in D,$$

$$P_b^D \leq \text{constant},$$

where $P_b^D$ is the blocking probability when downlink rate requirement is not fulfilled. The optimization problem in (3) is a NP-hard problem and difficult to solve, if possible, for practical cellular networks. In one embodiment, a sub-optimum power control problem may be established to find the solution. The sub-optimum power control problem is a cell-by-cell approach in a sequential fashion, and does not try to find optimum power control of a whole network at a single shot. Thus, a single cell m is taken into consideration at a time where the power control optimization problem may be given by:

$$\text{minimize} \quad P_m^D$$

$$\text{subject to} \quad P_n^D \leq B_{BS},$$

$$k_m^D \leq K,$$

$$R_{m,i}^D \geq R_D, \forall i \in S_m. \quad (4)$$

This is a non-convex problem, and trying to find a solution by exhaustive search takes a lot of time and is not practical. The power control algorithm shown in Table 1 may be used to solve the optimization problem expressed in (4), which works cell-by-cell and in a sequential and iterative manner. A main idea of the power control algorithm is assigning RBs to UEs one-by-one in a way such that the assignment maximizes the decrease in the objective of optimization problem (4).

By using the embodiment power control algorithms, such as illustrated in FIGS. 6-7, performance of the embodiment CSO methods is also shown to be improved when CoV increases. FIG. 15 illustrates a graph 1500 of how uplink transmission power saving varies with CoV using an embodiment CSO method. The Y-axis of the graph 1500 represents a ratio, in percentage, of the saved UEs' sum power of the embodiment CSO method to that of the improved cell-zooming algorithm. In this example, the number of picocell BSs is 30, and only picocell BSs are candidates for switch-off. Curves 1502, 1504 and 1506 represent the ratio when the number of UEs is 50, 100 and 150, respectively. It can be seen, the uplink power saving is between about 25-35% when CoV is 1, and increases to between about 33-44% when CoV is 2.5.

FIG. 16 illustrates a graph 1600 of how uplink transmission power saving varies with the number of picocell BSs using an embodiment CSO method. Similarly, only picocell BSs are candidates for switch-off in this example, and CoV is 1. The Y-axis of the graph 1500 represents a ratio, in percentage, of the saved UEs' sum power of the embodiment CSO method to that of the improved cell-zooming algorithm. It can be seen from the graph 1600, the performance of the embodiment CSO method also improves in comparison with the improved cell-zooming algorithm, when the number of picocell BSs increases. Curves 1602, 1604 and 1606 represent the ratio when the number of UEs is 50, 100 and 150, respectively. Graph 1600 shows that the uplink power saving increases approximately from 17-25% to 31-45% when the number of picocell BSs increases from 20 to 40.

Embodiments in the present disclosure provide a user-aware CSO algorithm where the user accessibility in the normal coverage area is not affected by switching off BSs. This is done by assuming a virtual UE distribution in the full coverage area, specifying the minimum control channel communication requirements for uplink and downlink, and implementing the embodiment cell-switch-off algorithm with this added constraint.

Embodiments in the present disclosure include control signaling messages between BSs and UEs to support CSO embodiments. The BSs send messages to UEs, requesting channel information and battery levels. UEs then report their battery levels and battery saving requirements, and channel information. After CSO optimization is made, BSs send instructions to UEs for cell association and battery operation recommendations, including transmit power level and bandwidth assignment.

Other control messages are used to configure the BSs and UEs so that the channel measurements can be made when some BSs are turned on or off dynamically. The messages include timing information so that the BSs can be turned on at certain times to send downlink pilot signals for channel estimation and the UE receivers can estimate the channel information in the downlink. The timing information includes the times that UEs send uplink pilot signals so that the receivers of BSs will be turned on to measure the uplink channel information. In time-division duplex (TDD) systems, the uplink channel information can be used to estimate the downlink channel by some calibration procedures.

Figure 17:
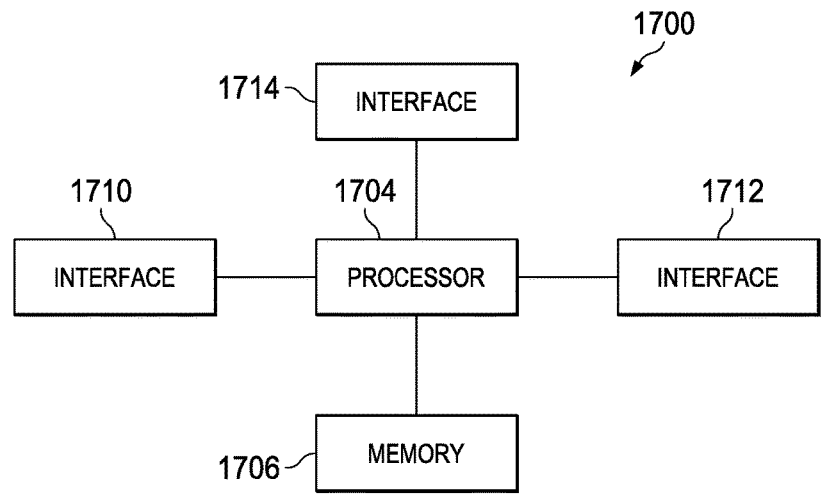
FIG. 17 illustrates a diagram of an embodiment processing system.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 11804. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 11804 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a UT, a UE, a personal computer (PC), a tablet, a wearable communications device (e.g., a smartwatch, etc.), or any other device adapted to access a telecommunications network.

Figure 18:
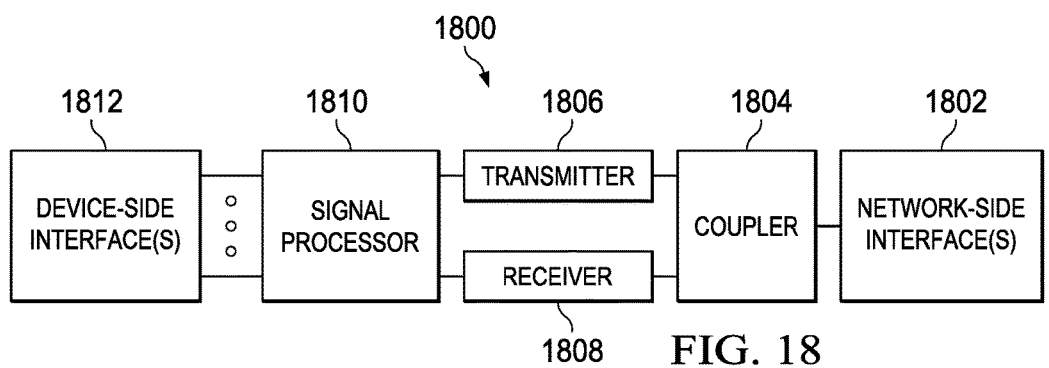
FIG. 18 illustrates a diagram of an embodiment transceiver.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present disclosure. Each of these references is incorporated herein by reference in its entirety:

[1] Y. Chen, S. Zhang, S. Xu, and G. Y. Li, "Fundamental trade-offs on green wireless networks," *IEEE Commun. Magazine*, vol. 49, no. 6, pp. 30-37, June 2011.

[2] N. Chilamkurti, S. Zeadally, and F. Mentiplay, "Green networking for major components of information communication technology systems," *EURASIP Journal on Wireless Communications and Networking*, vol. 2009, December 2009, doi:10.1155/2009/656785.

[3] G. Miao, N. Himayat, G. Li, and A. Swami, "Cross-layer optimization for energy efficient wireless communications: A survey," *Wiley J. Wireless Commun. and Mobile Computing*, vol. 9, no. 4, pp. 529-542, April 2009.

[4] M. Ajmone Marsan, L. Chiaraviglio, D. Ciullo, and M. Meo, "On the effectiveness of single and multiple base station sleep modes in cellular networks," *Elsevier Computer Networks*, vol. 57, no. 17, pp. 3276-3290, July 2013.

[5] I. Humar, X. Ge, L. Xiang, M. Jo, M. Chen, and J. Zhang, "Rethinking energy efficiency models of cellular networks with embodied energy," *IEEE Network*, vol. 25, no. 2, pp. 40-49, March 2011.

[6] K. Son and B. Krishnamachari, "SpeedBalance: speed-scaling-aware optimal load balancing for green cellular networks," in *IEEE INFOCOM*, Orlando, USA, March 2012, pp. 2816-2820.

[7] U. Paul, A. P. Subramanian, M. M. Buddhikot, and S. R. Das, "Understanding traffic dynamics in cellular data networks," in *IEEE INFOCOM*, Shanghai, China, April 2011, pp. 882-890.

[8] Z. Niu, Y. Wu, J. Gong, and Z. Yang, "Cell zooming for cost-efficient green cellular networks," *IEEE Commun. Magazine*, vol. 48, no. 11, pp. 74-79, November 2010.

[9] F. Alaca, A. Bin Sediq, and H. Yanikomeroglu, "A genetic algorithm based cell switch-off scheme for energy saving in dense cell deployments," in *IEEE Globecom Workshops*, Anaheim, USA, December 2012, pp. 63-68.

[10] G. Micallef, P. Mogensen, and H. O. Scheck, "Cell size breathing and possibilities to introduce cell sleep mode," in *European Wireless* 2010, Lucca, Italy, April 2010, pp. 111-115.

[11] A. Bousia, A. Antonopoulos, L. Alonso, and Ch. Verikoukis, "'Green' distance-aware base station sleeping algorithm in LTE-Advanced," in *IEEE ICC*, Ottawa, Canada, June 2012, pp. 1347-1351.

[12] E. Oh, K. Son, and B. Krishnamachari, "Dynamic Base Station Switching-On/Off Strategies for Green Cellular Networks," *IEEE Trans. on Wireless Commun.*, vol. 12, no. 5, pp. 2126-2136, May 2013.

[13] L. A. Suarez, L. Nuaymi, and J.-M. Bonnin, "Analysis of the overall energy savings achieved by green cell-breathing mechanisms," in *Sustainable Internet and ICT for Sustainability (SustainIT)*, Pisa, Italy, October 2012, pp. 1-6.

[14] T. Kang, X. Sun, and T. Zhang, "Base station switching based dynamic energy saving algorithm for cellular networks," in *3rd IEEE International Conference on Network Infrastructure and Digital Content (IC-NIDC* 2012), Beijing, China, September 2012, pp. 66-70.

[15] C. Turyagyenda, K. Al-Begain, and N. Albeiruti, "A novel sleep mode operation for energy efficient LTE cellular networks: A sum product algorithm implementation," in *7th International Conference on Next Generation Mobile Apps, Services and Technologies (NGMAST)*, Prague, Czech Republic, September 2013, pp. 159-164.

[16] M. Ajmone Marsan, L. Chiaraviglio, D. Ciullo, and M. Meo, "Optimal energy savings in cellular access networks," in *IEEE ICC*, Dresden, Germany, June 2009, pp. 1-5.

[17] Bousia, E. Kartsakli, L. Alonso, and C. Verikoukis, "Energy efficient base station maximization switch off scheme for LTE-advanced," in *17th IEEE International Workshop on Computer Aided Modeling and Design of Communication Links and Networks (CAMAD)*, Barcelona, Spain, September 2012, pp. 256-260.

[18] S. Morosi, P. Piunti, and E. Del Re, "Improving cellular network energy efficiency by joint management of sleep mode and transmission power," in *24th Tyrrhenian International Workshop on Digital Communications (TIWDC) on "Green ICT"*, Genoa, Italy, September 2013, pp. 1-6.

[19] D. Gonzalez G, H. Yanikomeroglu, M. Garcia-Lozano, and S. R. Boque, "A novel multiobjective framework for cell switch-off in dense networks", in *IEEE ICC,* Sydney, Australia, June 2014, pp. 2641-2647.

[20] J. Peng, P. Hong, and K. Xue, "Stochastic analysis of optimal base station energy saving in cellular networks with sleep mode," *IEEE Commun. Letters*, vol. 18, no. 4, pp. 612-615, April 2014.

[21] A. Kumar and C. Rosenberg, "Energy and throughput trade-offs in cellular networks using base station switching," *IEEE Trans. Mobile Computing*, DOI 10.1109/TMC.2015.2416181, in press.

[22] I. Aydin, H. Yanikomeroglu, and U. Aygoli), "User-aware cell switch-off algorithms," in *11th International Wireless Communications & Mobile Computing Conference (IWCMC)*, Dubrovnik, Croatia, August 2015, pp. 1236-1241.

[23] M. Mirahsan, R. Schoenen, and H. Yanikomeroglu, "HetHetNets: Heterogeneous traffic distribution in heterogeneous wireless cellular networks," *IEEE Journal on Selected Areas in Communications, Special Issue on Recent Advances in Heterogeneous Cellular Networks*, vol. 33, no. 10, pp. 2252-2265, October 2015.

[24] I. Guvenc, M.-R. Jeong, I. Demirdogen, B. Kecicioglu, and F. Watanabe, "Range expansion and inter-cell interference coordination (ICIC) for picocell networks," in *IEEE Veh. Tech. Conf. (VTC-Fall)*, San Francisco, USA, September 2011, pp. 1-6.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method, comprising:
   receiving a set of quality of service (QoS) requirements for user equipments (UEs) being served by a plurality of base stations (BSs) in a wireless network;
   estimating, based on at least one QoS requirement of the set of QoS requirements, an increase in an uplink transmission power level of UEs served by a BS in the plurality of BSs, the increase in the uplink transmission power level associated with switching off the BS;
   determining whether the BS is to be switched off in accordance with the estimated increase in the uplink transmission power level; and
   sending an instruction to a device in the wireless network indicating that the BS is to be switched off in response to determining that the BS is to be switched off.

2. The method of claim 1, wherein the determining comprises determining whether the BS is to be switched off in accordance with a QoS requirement associated with a UE served by the BS.

3. The method of claim 1, comprising:
   estimating, based on the at least one QoS requirement, an increase in an uplink transmission power level of UEs served by a second BS, the increase in the uplink transmission power level associated with switching off the second BS;
   determining whether the second BS is to be switched off in accordance the estimated increase in the uplink transmission power level associated with switching off the second BS; and
   sending a second instruction to the device in the wireless network indicating that the second BS is to be switched off in response to determining that the second BS is to be switched off.

4. The method of claim 1, wherein the determining comprises:
   determining that the BS is to be switch off when the estimated increase in the uplink transmission power level associated with switching off the BS satisfies a criteria.

5. The method of claim 4, wherein the uplink transmission power level corresponds to a total or average uplink transmission power level of the UEs served by the plurality of BSs.

6. The method of claim 4, wherein the criteria is satisfied when the estimated increase in the uplink transmission power level associated with switching off the BS is less than a threshold.

7. The method of claim 4, wherein the criteria is satisfied when the estimated increase in the uplink transmission power level associated with switching off the BS is less than an estimated increase in the uplink transmission power level for switching off any other BS in the plurality of BSs.

8. The method of claim 1, wherein the BS is determined to be switched off when QoS requirements of at least a threshold number of UEs being served by the BS are satisfied if the BS was switched off.

9. The method of claim 1, wherein the set of QoS requirements comprise latency requirements, uplink or downlink bit-rate requirements, transmission power requirements, jitter requirements, packet loss requirements, or error rate requirements.

10. The method of claim 1, wherein the BS is determined to be switched off when a threshold number of UEs being served by the BS have at least a minimum amount of stored battery power.

11. The method of claim 1, wherein the BS is determined to be switched off when a threshold number of UEs being served by the BS are not classified as prioritized power saving UEs.

12. A method for switching off base stations (BSs) in a wireless network, comprising:
    estimating, for each of the BSs, an increase in an uplink transmission power level if a corresponding BS was switched off, based on at least uplink transmission rate information of user equipments (UEs) served by the BSs, the increase in the uplink transmission power level associated with switching off the corresponding BS;
    selecting a given one of the BSs to switch off, if the estimated increase in the uplink transmission power level associated with switching off the given BS satisfies a first criteria; and
    sending an instruction by a device, the instruction indicating that the given BS is to be switched off.

13. The method of claim 12, wherein the uplink transmission power level corresponds to a total or average uplink transmission power level of the UEs served by the BSs.

14. The method of claim 12, wherein the first criteria is satisfied when the estimated increase in the uplink transmission power level associated with switching off the given BS is less than an estimated increase in the uplink transmission power level associated with switching off any other BS in the BSs.

15. The method of claim 12, wherein selecting the given one of the BSs to switch off, if the estimated increase in the uplink transmission power level associated with switching off the given BS satisfies the first criteria comprises:
    selecting the given one of the BSs to switch off, if the first criteria and a second criteria are satisfied.

16. The method of claim 15, wherein the second criteria is satisfied if at least a threshold number of UEs being served by the given BS have at least a minimum amount of stored battery power, or are not classified as prioritized power saving UEs.

17. The method of claim 15, wherein the second criteria is satisfied if a UE outage rate of the wireless network is less than a threshold if the given BS was switched off.

18. The method of claim 15, wherein the second criteria is satisfied, if QoS requirements of at least a threshold number of UEs served by the given BS are satisfied if the given BS was switched off.

19. A device, comprising:
    a processor; and
    a non-transitory computer readable storage medium storing programming for execution by the processor, the programming including instructions for:
    receiving a signal indicating a set of quality of service (QoS) requirements for user equipments (UEs) being served by a plurality of base stations (BSs) in a wireless network;
    estimating, based on at least one QoS requirement of the set of QoS requirements, an increase in an uplink transmission power level of UEs served by a BS in the plurality of BSs, the increase in the uplink transmission power level associated with switching off the BS;
    determining whether the BS is to be switched off in accordance with the estimated increase in the uplink transmission power level; and
    sending an indication to a device, the indication indicating that the BS is to be switched off in response to determining that the BS is to be switched off.

20. The device of claim 19, wherein the determining comprises:
  determining that the BS is to be switched off when the estimated increase in the uplink transmission power level associated with switching off the BS satisfies a criteria.

21. The device of claim 20, wherein the criteria is satisfied when the estimated increase in the uplink transmission power level associated with switching off the BS is less than an estimated increase in the uplink transmission power level for switching off any other BS in the BSs.

22. The device of claim 19, wherein the BS is determined to be switched off when QoS requirements of at least a threshold number of UEs being served by the BS are satisfied if the BS was switched off.

* * * * *